(12) United States Patent
Doi et al.

(10) Patent No.: US 11,032,487 B2
(45) Date of Patent: Jun. 8, 2021

(54) INTERCHANGEABLE LENS AND METHOD FOR CONTROLLING THE SAME, SHOOTING APPARATUS, AND CAMERA SYSTEM

(71) Applicant: SONY CORPORATION, Tokyo (JP)

(72) Inventors: Nobuhiro Doi, Chiba (JP); Jun Aoyama, Kanagawa (JP); Syouei Hirasawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/329,585

(22) PCT Filed: Mar. 15, 2018

(86) PCT No.: PCT/JP2018/010123
§ 371 (c)(1),
(2) Date: Feb. 28, 2019

(87) PCT Pub. No.: WO2018/173902
PCT Pub. Date: Sep. 27, 2018

(65) Prior Publication Data
US 2020/0007730 A1      Jan. 2, 2020

(30) Foreign Application Priority Data
Mar. 23, 2017   (JP) .............................. JP2017-056879

(51) Int. Cl.
*H04N 5/238*       (2006.01)
*G03B 13/36*       (2021.01)
(Continued)

(52) U.S. Cl.
CPC .............. *H04N 5/238* (2013.01); *G03B 9/02* (2013.01); *G03B 13/36* (2013.01); *G03B 17/14* (2013.01); *H04N 5/2254* (2013.01)

(58) Field of Classification Search
CPC ................. H04N 5/238; H04N 5/2254; H04N 5/232122; H04N 5/23258; H04N 5/23287;
(Continued)

(56) References Cited

U.S. PATENT DOCUMENTS

2009/0285572 A1* 11/2009 Shibuno .................... G03B 3/10
                                                                    396/133
2010/0066897 A1*  3/2010 Miyanari ........... H04N 5/23209
                                                                    348/362
(Continued)

FOREIGN PATENT DOCUMENTS

CN         104603688 A      5/2015
EP          2891921 A1      7/2015
(Continued)

OTHER PUBLICATIONS

International Search Report and Written Opinion of PCT Application No. PCT/JP2018/010123, dated Jun. 19, 2018, 08 pages of ISRWO.

(Continued)

*Primary Examiner* — Luong T Nguyen
(74) *Attorney, Agent, or Firm* — Chip Law Group

(57) ABSTRACT

The present technology relates to an interchangeable lens and a method for controlling the same capable of starting shooting in consideration of mechanical fluctuations after a diaphragm is driven, a shooting apparatus, and a camera system. An interchangeable lens includes: a diaphragm; a diaphragm driving unit configured to drive the diaphragm; and a lens control unit configured to transmit diaphragm driving information including stabilization time information of the diaphragm to a shooting apparatus when the diaphragm driving unit drives the diaphragm. The present (Continued)

technology is applicable to lens-interchangeable digital cameras, and the like, for example.

20 Claims, 15 Drawing Sheets

(51) Int. Cl.
    *G03B 17/14*     (2021.01)
    *G03B 9/02*     (2021.01)
    *H04N 5/225*     (2006.01)

(58) Field of Classification Search
    CPC .......... G03B 13/36; G03B 17/14; G03B 9/02; G03B 7/003
    See application file for complete search history.

(56) References Cited

U.S. PATENT DOCUMENTS

2010/0232779 A1* 9/2010 Okamoto ............... G03B 7/085
    396/257

2013/0286235 A1* 10/2013 Matsumoto ........ H04N 5/23209
    348/220.1
2015/0215515 A1    7/2015 Isono et al.
2016/0037040 A1* 2/2016 Asano ................ H04N 5/23212
    348/364

FOREIGN PATENT DOCUMENTS

| | | | |
|---|---|---|---|
| JP | 2006-270862 | * | 10/2006 |
| JP | 2006-270862 A | | 10/2006 |
| JP | 2008-233889 A | | 10/2008 |
| JP | 2008-271412 A | | 11/2008 |
| JP | 2010-074313 A | | 4/2010 |
| JP | 2017-054135 A | | 3/2017 |
| RU | 2015111095 A | | 10/2016 |
| WO | 2014/034488 A1 | | 3/2014 |

OTHER PUBLICATIONS

Office Action for JP Patent Application No. 2018-540077, dated Mar. 17, 2020, 05 pages of Office Action and 03 pages of English Translation.

* cited by examiner

*FIG. 5*

| CURRENT F VALUE | TARGET F VALUE | CONVERGENCE TIME |
|---|---|---|
|  |  |  |
|  |  |  |
|  |  |  |
|  |  |  |

*FIG. 6*

| CONVERGENCE TIME | | TARGET F VALUE | |
|---|---|---|---|
| | | LESS THAN F8 | F8 OR MORE |
| CURRENT TEMPERATURE | LESS THAN 40°C | 10msec | 30msec |
| | 40°C OR MORE | 20msec | 40msec |

INTERCHANGEABLE LENS AND METHOD FOR CONTROLLING THE SAME, SHOOTING APPARATUS, AND CAMERA SYSTEM

CROSS REFERENCE TO RELATED APPLICATIONS

This application is a U.S. National Phase of International Patent Application No. PCT/JP2018/010123 filed on Mar. 15, 2018, which claims priority benefit of Japanese Patent Application No. JP 2017-056879 filed in the Japan Patent Office on Mar. 23, 2017. Each of the above-referenced applications is hereby incorporated herein by reference in its entirety.

TECHNICAL FIELD

The present technology relates to an interchangeable lens and a method for controlling the same, a shooting apparatus, and a camera system, and particularly to an interchangeable lens and a method for controlling the same capable of starting shooting in consideration of mechanical fluctuations after a diaphragm is driven, a shooting apparatus, and a camera system.

BACKGROUND ART

A diaphragm of a shooting apparatus is configured of seven blades and the like, for example, and increases or decreases the aperture diameter thereby to adjust the amount of light passing through an optical system. The blades of the diaphragm are generally driven by a motor via a gear, a shaft, or the like. There is known a shooting apparatus configured to start shooting after a diaphragm finishes being adjusted.

CITATION LIST

Patent Document

Patent Document 1: Japanese Patent Application Laid-Open No. 2010-2900

SUMMARY OF THE INVENTION

Problems to be Solved by the Invention

A change in aperture diameter of a diaphragm is influenced by loose between gears, twist of a shaft, or the like, and the aperture diameter converges on a target size while being subjected to overshoot or undershoot, for example, relative to the target size after a motor finishes being driven. It is not possible to know a time until overshoot or undershoot ends, and thus shooting can be started while a mechanical operation of the diaphragm does not end, for example.

The present technology has been made in terms of such a situation, and is directed to enabling shooting to be started in consideration of mechanical fluctuations after a diaphragm is driven.

Solutions to Problems

An interchangeable lens according to a first aspect of the present technology includes: a diaphragm; a diaphragm driving unit configured to drive the diaphragm; and a lens control unit configured to transmit diaphragm driving information including stabilization time information of the diaphragm to a shooting apparatus when the diaphragm driving unit drives the diaphragm.

In an interchangeable lens control method according to the first aspect of the present technology, a lens control unit of an interchangeable lens including a diaphragm, a diaphragm driving unit configured to drive the diaphragm, and the lens control unit transmits diaphragm driving information including stabilization time information of the diaphragm to the shooting apparatus when the diaphragm driving unit drives the diaphragm.

According to the first aspect of the present technology, the diaphragm driving information including the stabilization time information of the diaphragm is transmitted to the shooting apparatus when the diaphragm driving unit drives the diaphragm.

A shooting apparatus according to a second aspect of the present technology includes a body control unit configured to determine an exposure start timing on the basis of diaphragm driving information including stabilization time information of a diaphragm acquired from an interchangeable lens.

According to the second aspect of the present technology, the exposure start timing is determined on the basis of the diaphragm driving information including the stabilization time information of the diaphragm acquired from the interchangeable lens.

A camera system according to a third aspect of the present technology includes an interchangeable lens and a shooting apparatus on which the interchangeable lens is mounted, in which the interchangeable lens includes: a diaphragm; a diaphragm driving unit configured to drive the diaphragm; and a lens control unit configured to transmit diaphragm driving information including stabilization time information of the diaphragm to the shooting apparatus when the diaphragm driving unit drives the diaphragm, and the shooting apparatus includes: a body control unit configured to determine an exposure start timing on the basis of the diaphragm driving information.

According to the third aspect of the present technology, the interchangeable lens transmits the diaphragm driving information including the stabilization time information of the diaphragm when the diaphragm driving unit drives the diaphragm to the shooting apparatus, and the shooting apparatus determines the exposure start timing on the basis of the diaphragm driving information.

Effects of the Invention

According to the first to third aspects of the present technology, it is possible to start shooting in consideration of mechanical fluctuations after the diaphragm is driven.

Additionally, the effects described herein are not necessarily restrictive, and any effect described in the present disclosure may be obtained.

BRIEF DESCRIPTION OF DRAWINGS

FIG. 5 is a diagram illustrating exemplary table data stored in a recording unit.

FIG. 6 is a diagram illustrating still other exemplary table data stored in the recording unit.

MODE FOR CARRYING OUT THE INVENTION

Figure 1:
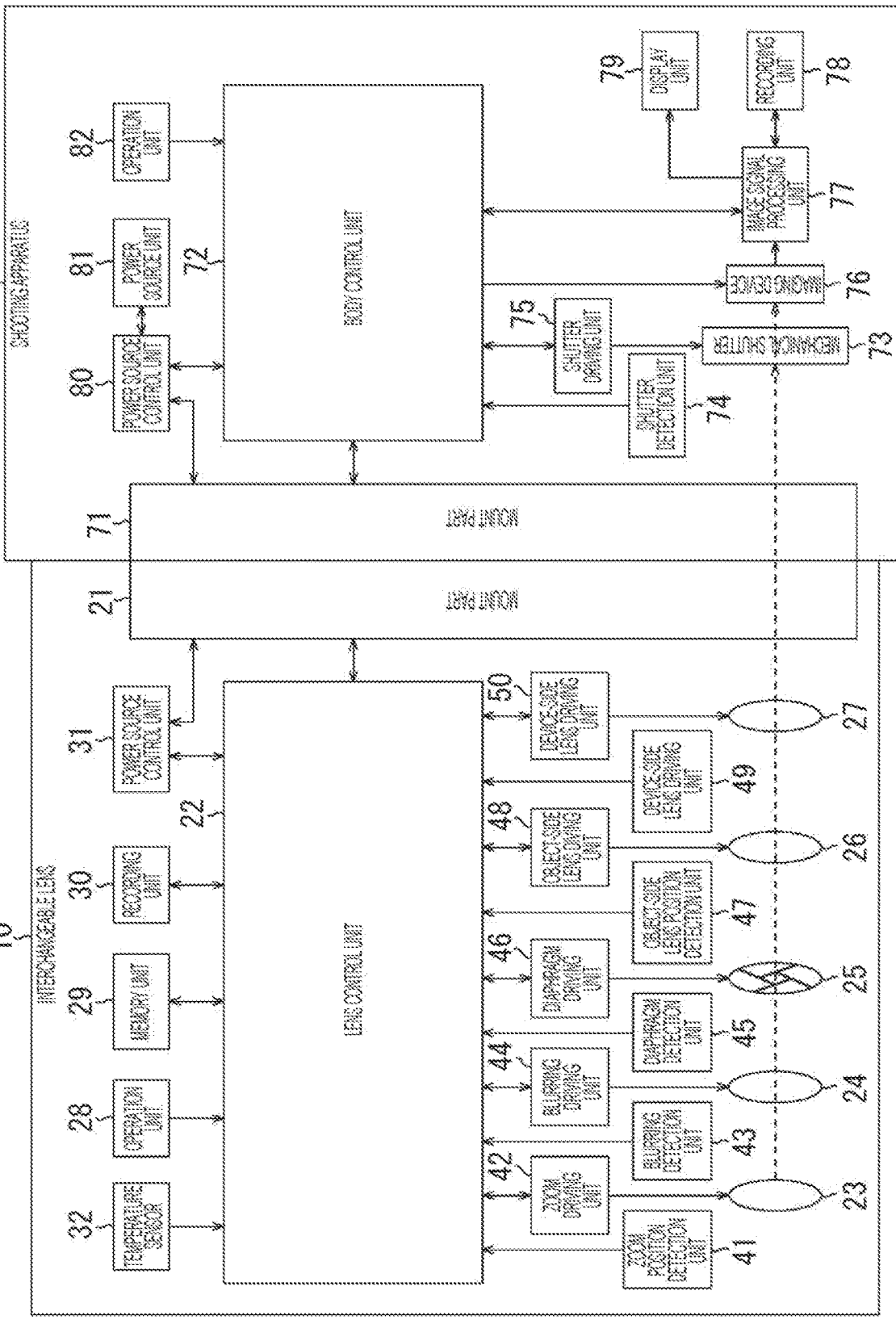
FIG. 1 is a block diagram illustrating an exemplary configuration of one embodiment of a camera system according to the present technology.

Modes (denoted as embodiments below) for carrying out the present technology will be described below. Additionally, the description will be made in the following order.
1. Block diagram of camera system
2. Operations of diaphragm
3. Time chart of shooting processing
4. How to calculate diaphragm driving end time
5. Flowchart
6. Exemplary processings when diaphragm driving end time is calculate in body
7. Exemplary driving system in which overshoot is possible
8. Synchronous command and asynchronous command 1. Block Diagram of Camera System FIG. 1 is a block diagram illustrating an exemplary configuration of one embodiment of a camera system according to the present technology.

A camera system 1 of FIG. 1 is a lens-interchangeable digital camera, and includes a detachable interchangeable lens 10 and a shooting apparatus 60 as a body.

The interchangeable lens 10 includes a mount part 21 detachably attached to a mount part 71 of the shooting apparatus 60. The mount part 21 has a plurality of terminals (not illustrated) electrically connected to the mount part 71 of the shooting apparatus 60.

Further, the interchangeable lens 10 includes a lens control unit 22, a zoom lens 23, a blurring correction lens 24, a diaphragm 25, an object-side focus lens 26, a device-side focus lens 27, an operation unit 28, a memory unit 29, a recording unit 30, a power source control unit 31, and a temperature sensor 32.

The interchangeable lens 10 has two kinds of focus lenses including the object-side focus lens 26 and the device-side focus lens 27 for autofocus control, where the object-side focus lens 26 is a focus lens closer to an objective lens (not illustrated) out of the two kinds of focus lenses, and the device-side focus lens 27 is a focus lens closer to an imaging device 76 of the shooting apparatus 60. Additionally, each of the object-side focus lens 26 and the device-side focus lens 27 includes one or more optical elements.

The lens control unit 22 is configured of a computation processing apparatus such as central processing unit (CPU) or micro processing unit (MPU), a peripheral circuit, and the like, for example, and reads and executes predetermined control programs recorded in the recording unit 30 thereby to control the entire interchangeable lens 10.

For example, the lens control unit 22 controls a position of the zoom lens 23 in response to an instruction from the shooting apparatus 60 supplied via a predetermined communication terminal of the mount part 21 or a user's operation received by the operation unit 28. More specifically, the lens control unit 22 acquires a current position of the zoom lens 23 from a zoom position detection unit 41, determines a driving direction and the driving amount for moving the zoom lens 23 to a predetermined position on the basis of the acquired result, and outputs the determined driving direction and driving amount to a zoom driving unit 42 together with a moving instruction. The zoom position detection unit 41 is configured of a magnetic sensor (MR sensor) or the like, for example, detects a position of the zoom lens 23, and supplies it to the lens control unit 22. The zoom driving unit 42 moves the zoom lens 23 in an optical axis direction to have the designated driving direction and driving amount in response to the moving instruction supplied from the lens control unit 22.

Further, the lens control unit 22 controls the blurring correction lens 24 to correct blurring. Specifically, the lens control unit 22 determines a driving direction and the driving amount of the blurring correction lens 24 in a direction in which the blurring amount is cancelled on the basis of the blurring amount detected by a blurring detection unit 43, and outputs the determined driving direction and driving amount to a blurring driving unit 44 together with a moving instruction. The blurring detection unit 43 is configured of a gyro sensor, a three-axis acceleration sensor, or the like. A gyro sensor is used to detect an offset (blurring) in a direction corresponding to Pitch or Yaw as a correction direction of the blurring correction lens 24, and a three-axis acceleration sensor is used to detect offsets (blurring) in the X-axis and Y-axis directions with the optical axis direction as Z axis. The blurring detection unit 43 may include either a gyro sensor or a three-axis acceleration sensor, or both of them. The blurring driving unit 44 moves the blurring correction lens 24 to have the designated driving direction and driving amount in response to the moving instruction supplied from the lens control 22.

The lens control unit 22 controls the aperture diameter of the diaphragm 25 in response to an instruction and the like from the shooting apparatus 60 supplied via a predetermined communication terminal of the mount part 21. Specifically, the lens control unit 22 acquires the aperture diameter of the diaphragm 25 detected by a diaphragm detection unit 45, instructs a diaphragm driving unit 46 to set a F value (aperture value) designated by the shooting apparatus 60, and moves the diaphragm 25. The diaphragm driving unit 46 moves the diaphragm 25 to have the aperture diameter designated by the lens control unit 22.

Further, the lens control unit 22 controls the two kinds of focus lenses including the object-side focus lens 26 and the device-side focus lens 27. Specifically, the lens control unit 22 acquires a current position of the object-side focus lens 26 from an object-side lens position detection unit 47, determines a driving direction and the driving amount for moving the object-side focus lens 26 to a predetermined position on the basis of the acquired result, and outputs the determined driving direction and driving amount to an object-side lens driving unit 48 together with a moving instruction. The object-side lens driving unit 48 moves the object-side focus lens 26 in the optical axis direction to have the designated driving direction and driving amount. Similarly, the lens control unit 22 acquires a current position of the device-side focus lens 27 from a device-side lens position detection unit 49, determines a driving direction and the driving amount for moving the device-side focus lens 27 to a predetermined position on the basis of the acquired result, and outputs the determined driving direction and driving amount to a device-side lens driving unit 50 together with a moving instruction. The device-side lens driving unit 50 moves the device-side focus lens 27 in the optical axis direction to have the designated driving direction and driving amount.

The object-side lens position detection unit 47 and the device-side lens position detection unit 49 can be configured of a magnetic sensor, a photodiode array, a potentiometer, a reflective encoder, or the like, for example.

The object-side lens driving unit 48 and the device-side lens driving unit 50 may employ an ultrasonic motor, a DC motor, a linear actuator, a stepping motor, a piezoelectric device, or the like, for example, but a DC motor or an ultrasonic motor is suitable when a heavy focus lens with a long lens diameter or a thick lens is driven. In a case where the interchangeable lens 10 has two kinds of focus lenses including the object-side focus lens 26 and the device-side focus lens 27, the object-side focus lens 26 is generally heavier.

Additionally, the interchangeable lens 10 does not necessarily need to have two kinds of focus lenses, and either the object-side focus lens 26 or the device-side focus lens 27 may be omitted. In this case, the lens position detection unit and the lens driving unit required for controlling the omitted focus lens are also omitted.

The operation unit 28 corresponds to a zoom ring configured to manually set a zoom magnification, a focus ring configured to manually set a focus lens, or the like, receives a user's manual operation, and supplies an operation signal corresponding to the received operation to the lens control unit 22.

The memory unit 29 is a volatile storage medium such as random access memory (RAM) and the like, and is used as a storage area for various items of data in use.

The recording unit 30 is a nonvolatile storage medium, and the recording unit 30 stores therein various items of data such as predetermined control programs executed by the lens control unit 22, or adjustment parameters.

The power source control unit 31 detects the amount of power supplied from the shooting apparatus 60, optimally distributes the amount of power to the respective units (the lens control unit 22 or various driving units) in the interchangeable lens 10 on the basis of the detected amount of power, and supplies them with power.

The temperature sensor 32 detects a temperature around or inside the interchangeable lens 10, and supplies it to the lens control unit 22. A detection result of the temperature sensor 32 is used to determine a parameter when considering a change in temperature.

On the other hand, the shooting apparatus 60 as a body includes the mount part 71 to which the interchangeable lens 10 is detachably attached. The mount part 71 has a plurality of terminals (not illustrated) electrically connected to the mount part 21 of the interchangeable lens 10.

When the interchangeable lens 10 is mounted on the mount part 71 of the shooting apparatus 60, each terminal of the mount part 71 corresponding to each terminal of the mount part 21 of the interchangeable lens 10 are electrically and physically connected. The connected terminals area terminal for supplying power (power supply terminal), a terminal for transmitting commands or data (communication terminal), a terminal for transmitting synchronous signals (synchronous signal terminal), and the like, for example.

The shooting apparatus 60 further includes a body control unit 72, a mechanical shutter 73, a shutter detection unit 74, a shutter driving unit 75, an imaging device 76, an image signal processing unit 77, a recording unit 78, a display unit 79, a power source control unit 80, a power source unit 81, and an operation unit 82.

The body control unit 72 is configured of a computation processing apparatus such as central processing unit (CPU) or micro processing unit (MPU), a nonvolatile memory, a peripheral circuit, and the like, for example, and reads and executes predetermined control programs stored in an internal nonvolatile memory thereby to control the entire camera system 1.

For example, the body control unit 72 causes the imaging device 76 to shoot, transmits a predetermined command to the interchangeable lens 10 via the mount part 71, and drives the focus lenses (the object-side focus lens 26 and the device-side focus lens 27), the zoom lens 23, and the like in response to an operation signal indicating a user's predetermined operation supplied from the operation unit 82.

Further, for example, the lens position information of the focus lenses, the zoom position information of the zoom lens 23, or the like is supplied from the interchangeable lens 10 to the body control unit 72 via the mount part 71, and the body control unit 72 causes the imaging device 76 to shoot an image to be recorded in the recording unit 78 or an image to be transmitted to an external device at an optimum timing based on the information. (The data of) the image acquired by the imaging device 76 is recorded (stored) in the recording unit 78 or displayed on the display unit 79 under control of the body control unit 72.

The mechanical shutter 73 is arranged in front of the imaging device 76, and opens/closes under control of the shutter driving unit 75. When the mechanical shutter 73 is closed, a light of an object passing through the optical system of the interchangeable lens 10 is shut. The shutter detection unit 74 detects the opened/closed state of the mechanical shutter 73, and supplies it to the body control unit 72. The shutter driving unit 75 drives the mechanical shutter 73 to be opened or closed under control of the body control unit 72.

The imaging device 76 is configure of a charge coupled device (CCD), a complementary metal oxide semiconductor (CMOS) sensor, or the like, for example, shoots an object, and generates and outputs image data thereof.

The imaging device 76 includes a pixel array part in which pixels (imaging pixels) configured to generate an image generation signal are arranged in a matrix shape. Further, some pixels in the pixel array part include phase difference pixels configure to generate a focus detection signal. In the phase difference pixels, part of a light receiving region is shut by a light shielding film, and a focus offset can be detected from pixel signals output from two phase difference pixels symmetrical with respect to the optical axis in the light shielding region shut by the light shielding film.

Additionally, in a case where the imaging device 76 is configured of a CCD sensor or a CMOS sensor, an electronic shutter can be used and the mechanical shutter 73 can be omitted. In a case where the mechanical shutter 73 is omitted, the shutter detection unit 74 and the shutter driving unit 75 used for controlling the same are also omitted.

The image signal processing unit 77 performs a predetermined image signal processing on an image supplied from the imaging device 76. For example, the image signal processing unit 77 converts a RAW image supplied from the imaging device 76 into image data in a predetermined file format, and causes the recording unit 78 to record the image data. Further, the image signal processing unit 77 performs a demosaic processing on the RAW image, further performs lossless compression or lossy compression thereby to convert the RAW image into image data in a predetermined file format, and causes the recording unit 78 to record the image data. Further, for example, the image signal processing unit 77 converts the image data supplied from the imaging device 76 into an image signal in a predetermined display format, supplies the image signal to the display unit 79, and causes the display unit 79 to display the shot image.

The recording unit 78 is configured of a nonvolatile memory, for example, and records (stores) therein data of the images shot by the imaging device 76, and the like. A recording medium for the recording unit 78 may be detachable.

The display unit 79 is configured of a panel-type display apparatus such as liquid crystal panel or organic electro luminescence (EL) panel, and displays an image (moving picture or still image) supplied from the image signal processing unit 77. The display unit 79 is mounted on the back opposed to the front on which the mount part 71 is arranged, and can display a live view image, a preview image, or the like.

The power source control unit 80 supplies each unit in the shooting apparatus 60 with power supplied from the power source unit 81. Further, the power source control unit 80 calculates the amount of power capable of being supplied to the interchangeable lens 10 in consideration of an operation state of the shooting apparatus 60, and supplies power to the interchangeable lens 10 via the mount part 71. The power source unit 81 is configured of a secondary battery such as NiCd battery, NiMH battery, or Li battery, an AC adapter, or the like, for example.

The operation unit 82 includes hardware keys such as release button, mode dial, and zoom button, and software keys on a touch panel laminated on the display unit 79, receives a user's predetermined operation, and supplies an operation signal thereof to the body control unit 72. The user operates the operation unit 82 thereby to set a shooting mode, to set a camera parameter, or the like, for example.

The interchangeable lens 10 and the shooting apparatus 60 configuring the camera system 1 have the above configurations, respectively. Additionally, the shooting apparatus 60 as a camera main body will be described below as a body 60.

2. Operations of Diaphragm

Figure 2:
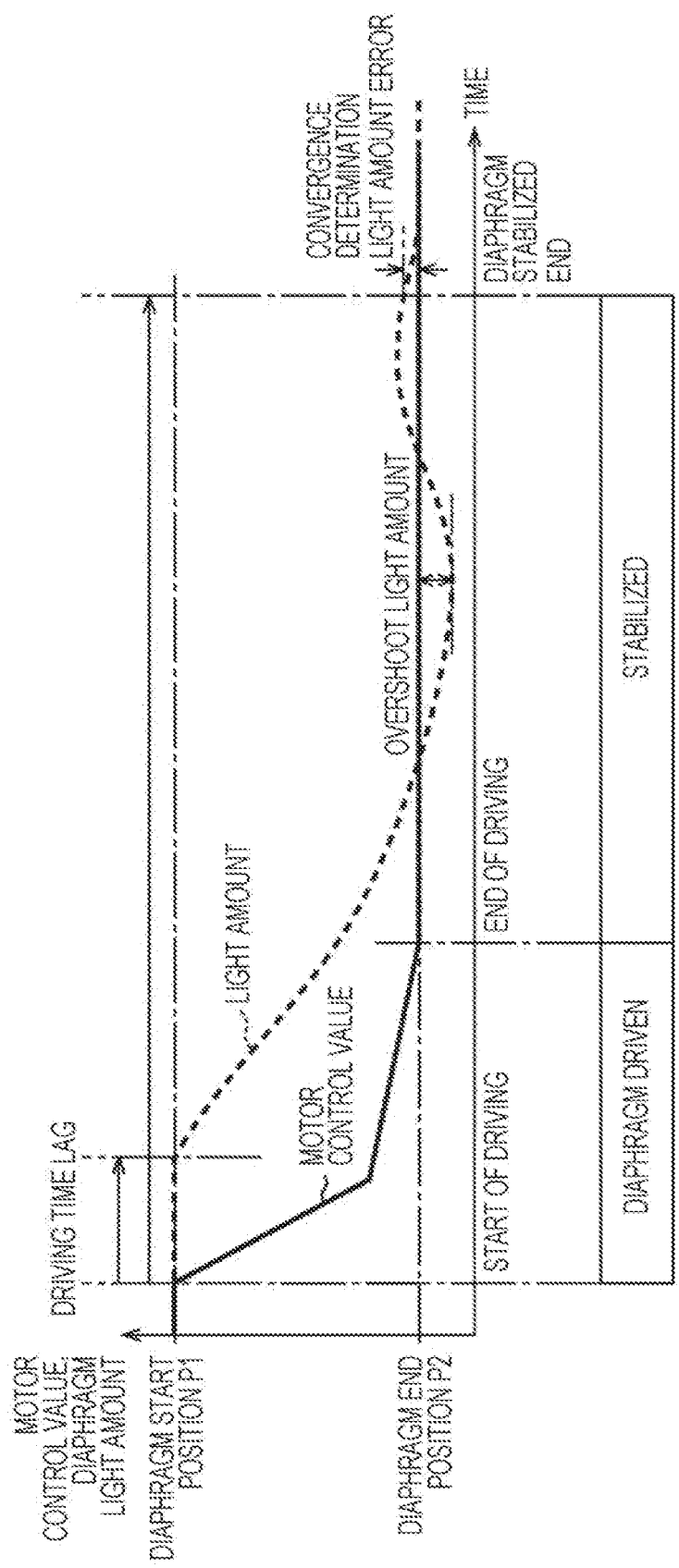
FIG. 2 is a diagram for explaining the operations of a diaphragm when the aperture diameter of the diaphragm is changed.

FIG. 2 is a diagram for explaining the operations of the diaphragm 25 when the aperture diameter of the diaphragm 25 is changed.

The horizontal axis indicates time and the vertical axis indicates a control value of a motor (such as stepping motor) for changing the aperture diameter of the diaphragm 25, or the amount of light passing through the diaphragm 25 in the graph of FIG. 2.

For example, in a case where a predetermined F value is designated from the body control unit 72 to the lens control unit 22, the lens control unit 22 instructs the diaphragm driving unit 46 to set the amount of light corresponding to the designated F value (target light amount value), and the diaphragm driving unit 46 drives the diaphragm 25 at the amount of light designated by the lens control unit 22. Specifically, the diaphragm driving unit 46 drives the motor in order to change the aperture diameter of the diaphragm 25 from the start position P1 of the current diaphragm 25 to the end position P2 of the diaphragm 25 corresponding to the designated F value.

As illustrated in FIG. 2, the motor control value is changed at a predetermined speed gradient from the start position P1 toward the end position P2, but the diaphragm 25 is configured of seven blades or the like, for example, and is driven by the motor via the gear, the shaft, or the like so that the amount of light passing through the aperture diameter and the opening region of the diaphragm 25 changes with predetermined delay (driving time lag) due to mechanical loose or the like. Further, also after the motor control value reaches the end position P2 and the motor finishes being driven, the aperture diameter of the diaphragm 25 changes due to elastic distortion or the like. Thus, overshoot or undershoot occurs as indicated in a broken line in FIG. 2, and the amount of light passing through the opening region of the diaphragm 25 converges on the target light amount value corresponding to the end position P2 after a predetermined time elapses from the end of motor driving.

In a case where the aperture diameter of the diaphragm 25 is changed in this way, it takes a predetermined time until the amount of light passing through the opening region of the diaphragm 25 converges within an error range where it can be determined that the amount of light reaches the target light amount value corresponding to the end position P2 after the diaphragm driving operation of changing the motor control value to a value corresponding to the end position P2. The operation in the period until the amount of light converges on the target light amount value after the diaphragm 25 finishes being driven is assumed as stabilization operation, and the state in the period is assumed as stabilized state. The stabilization operation is caused by a mechanical structure such as loose between gears or twist of the shaft, for example. Additionally, the causes of overshoot or undershoot in various mechanical structures of the diaphragm 25 will be described below with reference to FIG. 10 to FIG. 12.

A time required for the stabilization operation is different depending on the kind or the like of the interchangeable lens 10, and has been handled by securing a constant margin on the body 60, for example. However, in a case where a time until the stabilized state is longer than the time secured by the body 60, shooting is performed in a state where the amount of light of the diaphragm 25 is unstable (inaccurate). Alternatively, in a case where a time until the stabilized state is shorter than the time secured by the body 60, an unwanted time lag is caused until the start of shooting.

Thus, the camera system 1 of FIG. 1 is configured such that when receiving a designated predetermined F value from the body control unit 72, the lens control unit 22 returns the driving end time of the diaphragm 25 including the stabilization time indicating a time in the stabilized state.

3. Time Chart of Shooting Processings

The processings until an image to be recorded starts being exposed after the release button full-press operation as an operation to start the shooting of the image to be recorded in the recording unit 78 will be described with reference to the time chart in FIG. 3.

Figure 3:
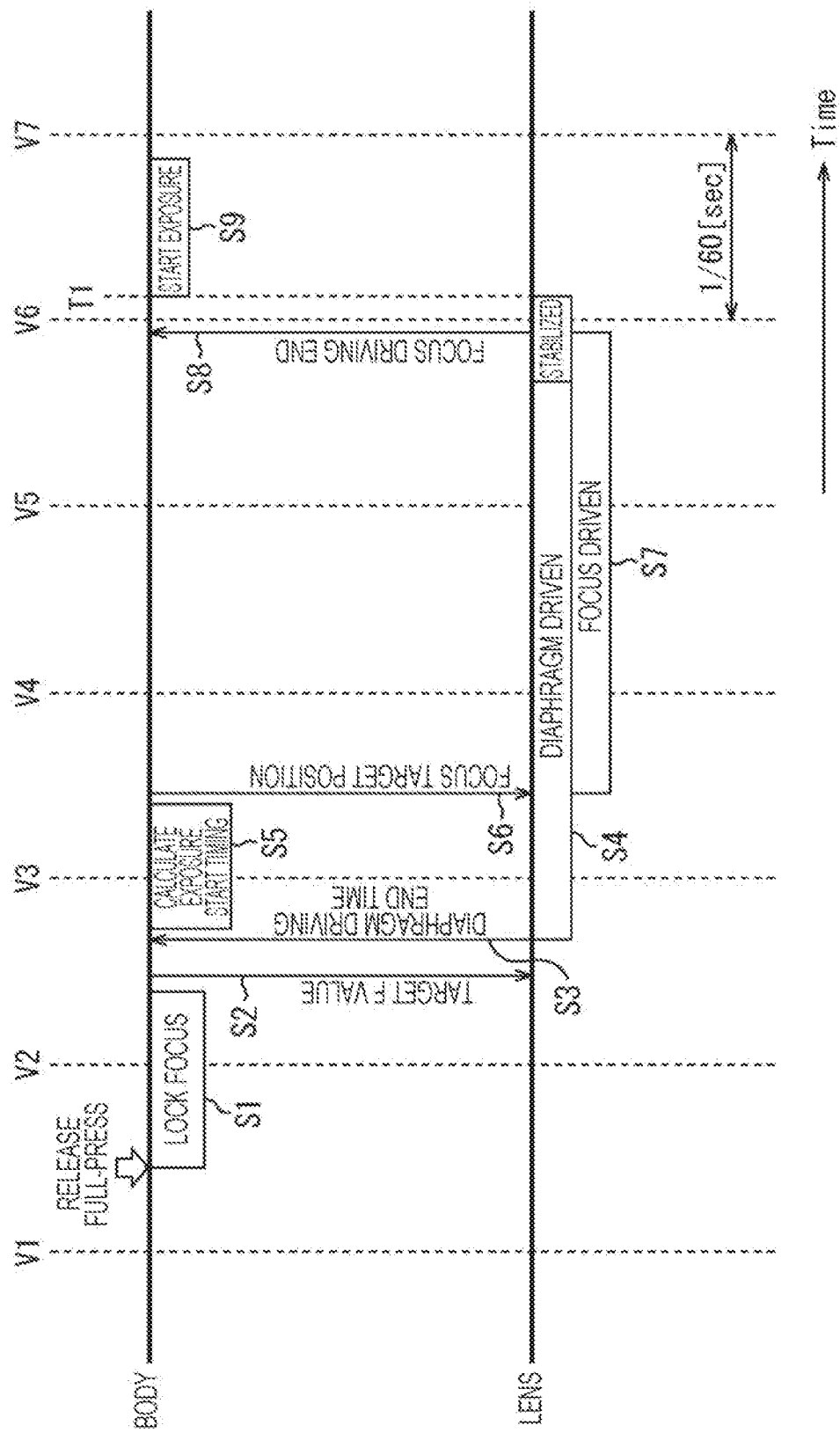
FIG. 3 is a time chart for explaining a shooting processing.

Additionally, the operations described in FIG. 3 are in the AF mode suitable when an object is moving, in which autofocusing works also while the release button is being half-pressed, and are in the continuous AF mode for keeping focusing.

The horizontal axis direction of FIG. 3 indicates time, where one period between broken lines corresponds to one cycle (1/60 sec, for example) defined by a synchronous signal or its multiplied or divided signal.

When the user performs the full-press operation while the release button is being half-pressed, the body control unit 72 of the body 60 keeps the focus position (locks the focus) when the full-press operation is performed in step S1. The diaphragm 25 is controlled at a lower value than the predetermined F value (such as "11") in the state. The present example assumes that the F value is set at "8" in the focus locked state.

Then in step S2, the body control unit 72 transmits a command to change the F value of the diaphragm 25 to a target F value determined by the user setting or the like (denoted as target F value below), for example, to the lens control unit 22.

When receiving the target F value command transmitted from the body control unit 72, the lens control unit 22 of the interchangeable lens 10 calculates a driving end time of the diaphragm 25 including the stabilization time (denoted as diaphragm driving end time below) for changing the F value from a current F value (denoted as current F value below) to the target F value, and transmits it to the body control unit 72 in step S3. It is assumed herein that the lens control unit 22 calculates a time until time T1 of FIG. 3 as the diaphragm driving end time and transmits it to the body control unit 72.

Additionally, the diaphragm driving end time transmitted from the lens control unit 22 to the body control unit 72 may be a time until the diaphragm 25 finishes being driven (required time), or a time when the diaphragm 25 finishes being driven, or information indicating the driving end timing of the diaphragm 25. Further, the information indicating the driving end timing of the diaphragm 25 may be information corresponding to a time when the diaphragm 25 finishes being driven, or information with a predetermined width (time) including at least the time when the diaphragm 25 finishes being driven.

Subsequently in step S4, the lens control unit 22 supplies a driving instruction to the diaphragm driving unit 46, and causes it to start driving the diaphragm 25 for the target F value.

Additionally, any of the processings in steps S3 and S4 may be started earlier, or may be performed at the same time. That is, the order of the timing when the diaphragm 25 starts being driven and the timing when the lens control unit 22 transmits the diaphragm driving end time to the body control unit 72 is not considered.

When receiving the diaphragm driving end time transmitted from the lens control unit 22, the body control unit 72 calculates an exposure start timing as a timing to cause the imaging device 76 to start exposing an image to be recorded in step S5.

The exposure start timing in step S5 is calculated as follows, for example. At first, the body control unit 72 predicts (calculates) a focus position when the diaphragm driving end time elapses on the basis of a motion of an object detected when the object is focused in the release button half-pressed state. The body control unit 72 then predicts (calculates) a focus driving time when a current focus position is moved to the predicted focus position on the basis of a difference between the predicted focus position and the current focus position. The body control unit 72 then calculates the exposure start timing when an image to be recorded can start being exposed on the basis of the calculated focus driving time and the diaphragm driving end time transmitted from the lens control unit 22. The exposure start timing corresponds to the longer time out of the focus driving time and the diaphragm driving end time.

In step S6, the body control unit 72 transmits a moving command to move the focus lens (at least one of the object-side focus lens 26 or the device-side focus lens 27) to the focus target position as a focus position when the diaphragm driving end time elapses, which is calculated in the processing in step S5.

Therefore, when receiving the diaphragm driving end time transmitted from the lens control unit 22, the body control unit 72 controls the focus lens (focus control) and determines the exposure start timing.

In step S7, the lens control unit 22 performs a focus driving processing of driving the focus lens to the focus target position in response to the focus lens moving command transmitted from the body control unit 72.

Then, when the focus lens completely moves to the focus target position, in step S8, the lens control unit 22 transmits the end of focus lens driving to the body control unit 72.

The body control unit 72 receives the end of focus lens driving, and then causes the imaging device 76 to start exposing (capturing) for shooting an image to be recorded in step S9 at time T1 when the diaphragm driving end time elapses.

Time T1 is when the diaphragm 25 finishes being driven including the stabilization time, and thus shooting can be started in consideration of mechanical fluctuations after the diaphragm is driven. In other words, an image to be recorded can start being shot at a timing not influenced by overshoot or undershoot of the diaphragm 25.

4. How to Calculate Diaphragm Driving End Time

Figure 4:
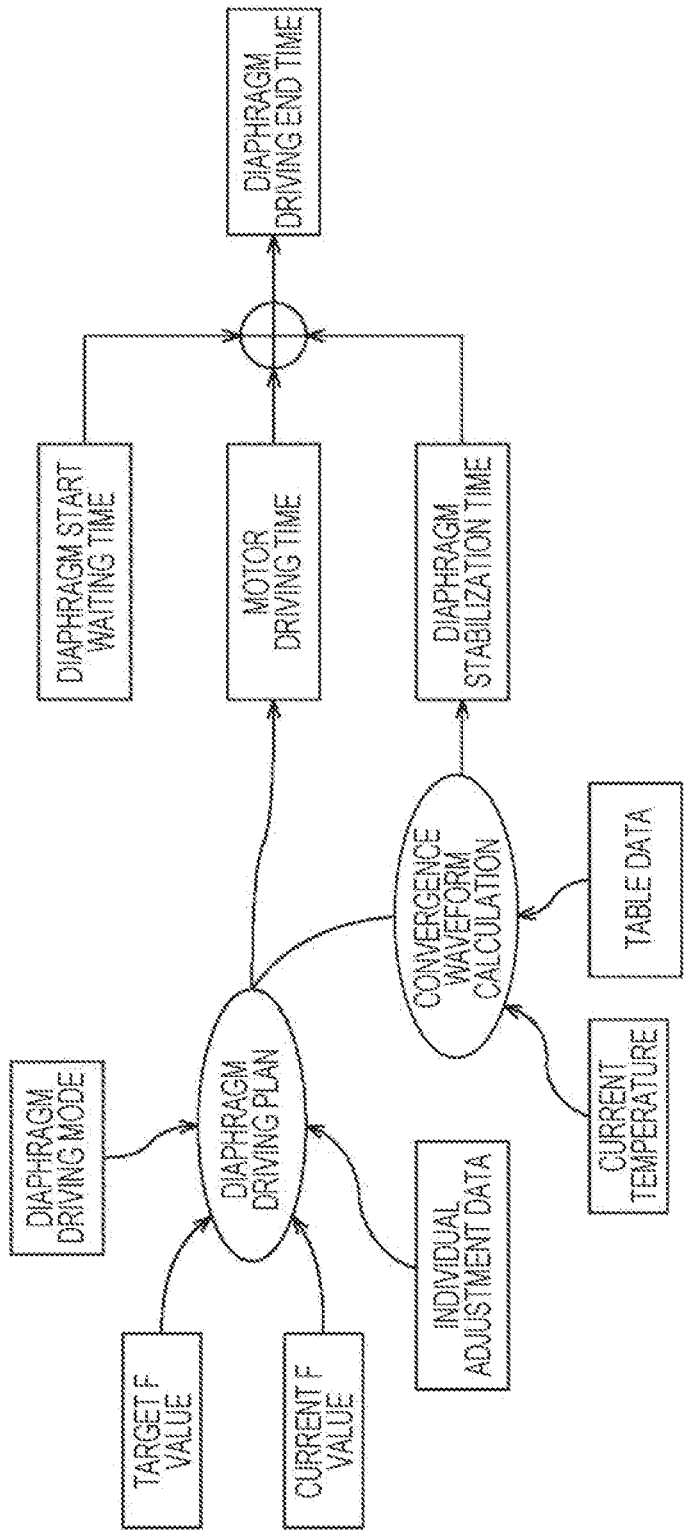
FIG. 4 is a diagram for explaining how to calculate a diaphragm driving end time by a lens control unit.

How to calculate the diaphragm driving end time performed by the lens control unit 22 will be described below with reference to FIG. 4.

At first, a driving plan of the diaphragm 25 is calculated on the basis of the current F value, the target F value, the diaphragm driving mode, individual adjustment data, and the like.

Here, the driving plan of the diaphragm 25 is information indicating a change (gradient) of the motor control value over time indicated in a solid line in the diaphragm driving operation in the graph of FIG. 2, and indicates how the motor control value is changed from the current F value to the target F value. A time required for the subsequent stabilization operation changes depending on a gradient of the motor control value.

For example, as indicated in the solid line of the diaphragm driving operation in the graph of FIG. 2, the lens control unit 22 calculates the driving plan to drive the first ¾ of the moving distance from the start position P1 to the end position P2 at a first driving speed and to drive the last ¼ to the end position P2 at a second driving speed lower than the first driving speed. Additionally, the driving plan does not need to be linearly controlled.

The diaphragm driving mode is a high-speed driving mode, a low-speed driving mode, and the like, for example, and is a driving speed mode capable of being changed by user setting. The individual adjustment data is parameters for adjusting an individual difference of the interchangeable lens 10.

The lens control unit 22 calculates the motor driving time according to the driving plan of the diaphragm 25 calculated on the basis of the current F value, the target F value designated by the body control unit 72, the current diaphragm driving mode setting, the individual adjustment data, and the like.

The lens control unit 22 then calculates the stabilization time of the diaphragm 25 as a time until the amount of light converges on the target light amount value after the end of motor driving on the basis of a convergence waveform in which the amount of light passing through the diaphragm 25 converges on the target light amount value over time.

For example, a function indicating the convergence characteristics is stored as a convergence waveform in the recording unit 30, and the lens control unit 22 calculates the stabilization time of the diaphragm 25 on the basis of the function indicating the convergence characteristics stored in the recording unit 30. The function indicating the convergence characteristics may be assumed as a function having the parameters such as an environment temperature detected by the temperature sensor 32, a posture (tilted state) of the interchangeable lens 10 detected by a gyro sensor or the like, a value indicating an aged state of the interchangeable lens 10, and the like.

Further, the lens control unit 22 may store table data as previously-measured convergence time (stabilization time) until the amount of light passing through the diaphragm 25 converges on the target light amount value over time after the motor stops being driven in the recording unit 30, and may calculate the stabilization time of the diaphragm 25 by use of the table data.

More specifically, as illustrated in FIG. 5, for example, the table data in which the convergence time (stabilization time) until the amount of light converges on the target light amount value is associated with a combination of the current F value and the target F value to be stored is stored in the recording unit 30, and the lens control unit 22 calculates the stabilization time of the diaphragm 25 by use of the table data.

Such table data can be created by use of the convergence time actually measured in the interchangeable lens 10, for example. Further, the table data can be created per external environment condition or use condition. For example, a plurality of items of table data are distributed per environment temperature as an external environment condition, and the lens control unit 22 switches the table data to be used and calculates the stabilization time depending on a current temperature detected by the temperature sensor 32. Further, for example, table data is provided per posture (tilted state) of the interchangeable lens 10 as a use condition, and the lens control unit 22 switches the table data depending on a posture detected by a gyro sensor or the like to be used, and calculates the stabilization time. Further, for example, as a use condition, table data may be switched for calculation depending on an aged state of the interchangeable lens 10. For example, the integrated value of the driving amount when the diaphragm 25 is driven is stored as an aged state of the interchangeable lens 10, and the lens control unit 22 switches and uses table data prepared per predetermined range of the integrated value, and calculates the stabilization time.

FIG. 6 illustrates still other exemplary table data.

In the table data of FIG. 6, not taking the current F value into consideration, the convergence time until the amount of light converges on the target light amount value is stored depending on the combinations of two cases where the target F value is less than F8 and is F8 or more and two cases where the current temperature detected by the temperature sensor 32 is less than 40° C. and is 40° C. or more.

The lens control unit 22 adds the motor driving time as calculated above, and the stabilization time of the diaphragm 25 thereby to calculate the diaphragm driving end time including the stabilization time.

Further, in a case where the lens control unit 22 does not start driving the diaphragm 25 for the target F value when transmitting the diaphragm driving end time to the body control unit 72, the waiting time until the diaphragm 25 starts being driven (diaphragm start waiting time) is also included in calculation of the diaphragm driving end time. In a case where the processings in steps S3 and S4 of FIG. 3 are performed at the same time or the processing in step S4 is started earlier than the processing in step S3, the diaphragm start waiting time is not included in the diaphragm driving end time. To the contrary, in a case where the processing (of starting driving the diaphragm) in step S4 is performed earlier than the processing (of transmitting the diaphragm driving end time) in step S3, the diaphragm driving end time is calculated except a time after the diaphragm driving unit 46 starts driving the diaphragm 25 and until the diaphragm driving end time is transmitted to the body control unit 72.

5. Flowchart

Figure 7:
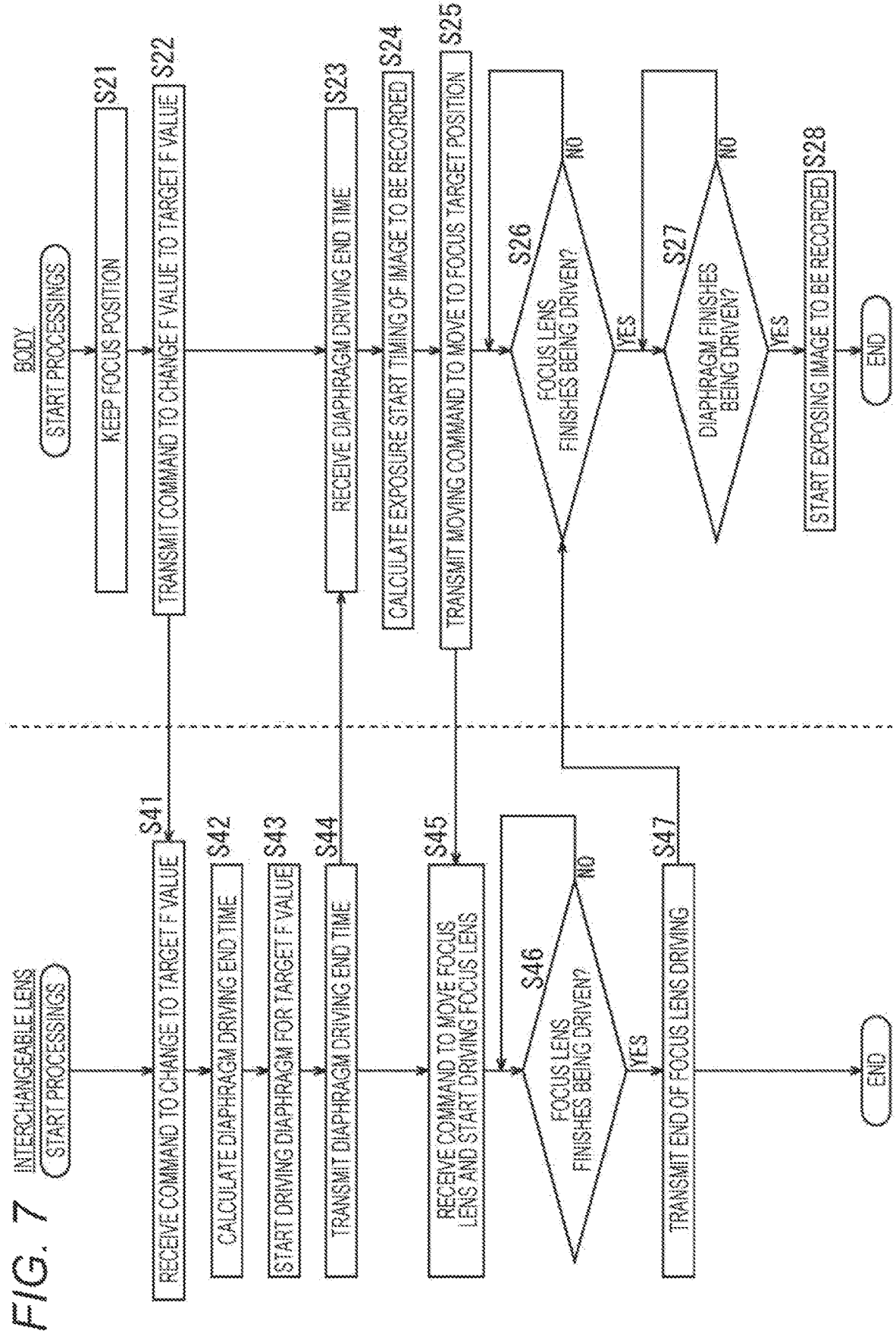
FIG. 7 is a flowchart for explaining the processings performed in an interchangeable lens and a body.

The processings until an image to be recorded starts being exposed after the release button full-press operation will be described below with reference to the flowchart of FIG. 7.

When the user performs the release button full-press operation, in step S21, the body control unit 72 keeps the focus position (locks the focus) when the full-press operation is performed.

In step S22, the body control unit 72 transmits a command to change the F value (aperture value) of the diaphragm 25 to the target F value.

In step S41, the lens control unit 22 of the interchangeable lens 10 receives the command to change the F value to the target F value transmitted from the body control unit 72.

Then in step S42, the lens control unit 22 calculates the diaphragm driving end time including the stabilization time when changing the F value from the current F value to the target F value.

In step S43, the lens control unit 22 supplies a driving instruction to the diaphragm driving unit 46, and causes it to start driving the diaphragm 25 for the target F value.

In step S44, the lens control unit 22 transmits the diaphragm driving end time including the stabilization time calculated in the processing in step S42 to the body control unit 72.

Additionally, the processing in step S44 may be performed earlier than the processing in step S43, or steps S43 and S44 may be performed at the same time.

In a case where the driving for the target F value is earlier started, the diaphragm driving end time does not include the waiting time until the diaphragm 25 starts being driven (diaphragm start waiting time). On the other hand, in a case where the diaphragm driving end time is earlier transmitted and a predetermined waiting time is caused until driving is started, the diaphragm start waiting time is also included in the diaphragm driving end time.

The body control unit 72 receives the diaphragm driving end time transmitted from the body control unit 72 in step S23, and calculates the exposure start timing to cause the imaging device 76 to start exposing an image to be recorded in step S24. The exposure start timing is determined on the basis of the focus driving time until the focus lens moves to the focus target position, and the diaphragm driving end time as described above.

Then in step S25, the body control unit 72 transmits, to the lens control unit 22, a moving command to move the focus lens to the focus target position with the focus predicted position when the diaphragm driving end time elapses as the focus target position.

In step S45, the lens control unit 22 of the interchangeable lens 10 receives the focus lens moving command transmitted from the body control unit 72, and starts driving the focus lens.

Then in step S46, the lens control unit 22 determines whether or not the focus lens finishes being driven to the designated focus target position, and waits until it is determined that the focus lens finishes being driven.

Then in step S46, in a case where it is determined that the focus lens finishes being driven, the processing proceeds to step S47, where the lens control unit 22 transmits the end of focus lens driving to the body control unit 72.

After the body 60 transmits a moving command to move the focus lens to the focus target position in step S25, the processing proceeds to step S26, where the body control unit 72 determines whether or not the focus lens finishes being driven or whether or not the end of focus lens driving is transmitted from the lens control unit 22.

In step S26, the processing waits until it is determined that the focus lens finishes being driven.

Then in step S26, in a case where it is determined that the focus lens finishes being driven, the processing proceeds to step S27, where the body control unit 72 determines whether or not the diaphragm 25 finishes being driven or whether or not the time when the diaphragm 25 finishes being driven corresponding to the diaphragm driving end time received in step S23 is reached.

In step S27, the processing waits until it is determined that the diaphragm 25 finishes being driven.

Then in step S27, in a case where it is determined that the diaphragm 25 finishes being driven, the processing proceeds to step S28, where the body control unit 72 causes the imaging device 76 to start exposing (capturing) for shooting an image to be recorded.

After the end of exposure, an image signal of the image to be recorded output from the imaging device 76 is recoded in the recording unit 30.

As described above, in the camera system 1 according to the technology of the present disclosure, the lens control unit 22 of the interchangeable lens 10 calculates the diaphragm driving end timing including the stabilization time when the diaphragm driving unit 46 drives the diaphragm 25 in response to a command to drive the diaphragm 25 from the body control unit 72, and transmits it as diaphragm driving information to the body control unit 72.

The body control unit 72 can accurately grasp the diaphragm driving end timing including the stabilization time, and can further shorten the time until the start of shooting (can further speed up shooting) than in a case where a certain margin is secured for an unknown stabilization time in the body 60, for example, thereby contributing to an improvement in focusing accuracy.

Further, exposure for shooting an image to be recorded can be started at a timing not influenced by overshoot or the like of the diaphragm 25, thereby improving the shot image exposure accuracy.

Further, in a case where a phase difference is detected, the unstable diaphragm influences the phase difference detection accuracy. The phase difference is detected at the diaphragm driving end timing including the stabilization time, thereby improving the phase difference detection accuracy.

Further, the driving end timing of the diaphragm 25 when overshoot by driving the diaphragm 25 ends and is stabilized is provided in notification to the body 60 before the end of driving, and is used to calculate the next shooting start timing, thereby shortening the shooting interval when continuously shooting as in the continuous shooting, and further improving the focusing accuracy.

6. Exemplary Processings when Calculating Diaphragm Driving End Time in Body The above example describes that the lens control unit 22 of the interchangeable lens 10 calculates the diaphragm driving end time and transmits it as diaphragm driving information to the body control unit 72, and how to calculate the diaphragm driving end time in the body 60 will be described below. In this case, the body control unit 72 acquires the parameters required for calculating the diaphragm driving end time (denoted as diaphragm driving parameters below) as diaphragm driving information from the lens control unit 22, and calculates the diaphragm driving end time.

Figure 8:
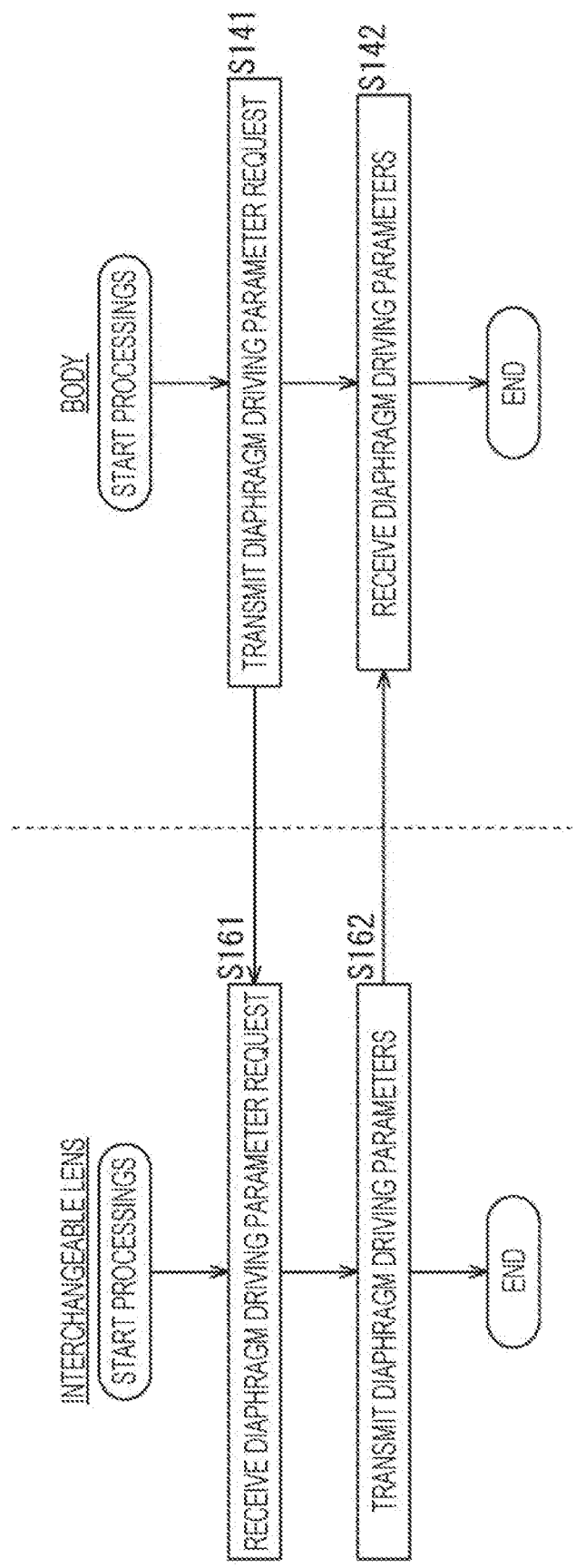
FIG. 8 is a flowchart for explaining the processings of acquiring a diaphragm driving parameter.

A processing of acquiring the diaphragm driving parameters from the lens control unit 22 by the body control unit 72 will be described with reference to the flowchart of FIG. 8. The processing is performed as part of initialization processings when the interchangeable lens 10 is mounted on the body 60, for example.

When the user mounts the interchangeable lens 10 on the body 60, in step S141, the body control unit 72 transmits a diaphragm driving parameter request to ask the interchangeable lens 10 for the diaphragm driving parameters to the interchangeable lens 10.

In step S161, the lens control unit 22 of the interchangeable lens 10 receives the diaphragm driving parameter request transmitted from the body control unit 72.

Then in step S162, the lens control unit 22 transmits the diaphragm driving parameters to the body control unit 72. The diaphragm driving parameters include parameters for computing a driving time of the diaphragm 25 including the information indicating the stabilization time (stabilization time information). Examples of the parameters are information for calculating a diaphragm driving trajectory such as motor acceleration/deceleration rate and maximum speed limit value, information for calculating the stabilization time such as relationship between position and F value of the diaphragm 25 and table data storing convergence waveform and convergence time, and the like, for example.

In step S142, the body control unit 72 receives the diaphragm driving parameters transmitted from the lens control unit 22 and stores them in the internal memory or the like.

This is the end of the processing of acquiring the diaphragm driving parameters. Additionally, the processing of acquiring the diaphragm driving parameters may be performed as part of a series of initialization processings when the interchangeable lens 10 is mounted on the body 60, or may be performed at other timing such as immediately before the diaphragm 25 is first moved, for example. In other words, the body control unit 72 can perform the processing at any timing before the diaphragm 25 is first moved.

Figure 9:
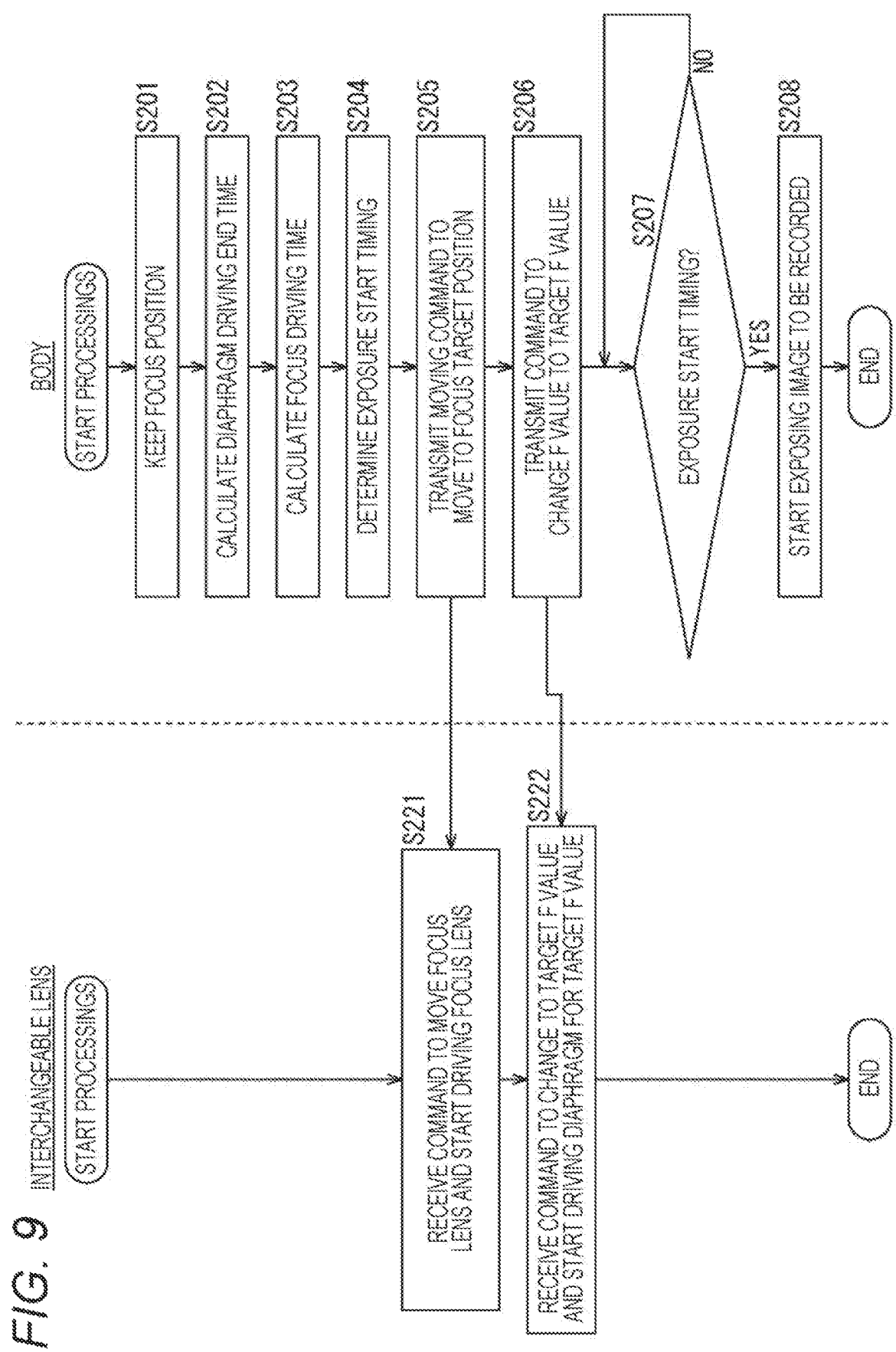
FIG. 9 is a flowchart for explaining the processings performed in the interchangeable lens and the body.

The processings after the release button is fully pressed and until an image to be recorded starts being exposed in a case where the body 60 calculates the diaphragm driving end time will be described below with reference to the flowchart of FIG. 9.

When the user performs the release button full-press operation, in step S201, the body control unit 72 keeps the focus position (locks the focus) when the full-press operation is performed. In this state, the diaphragm 25 is controlled at a lower value than the predetermined F value (such as "11"). The present example assumes that the F value is set at "8" in the focus locked state.

In step S202, the body control unit 72 calculates the diaphragm driving end time for changing the F value of the diaphragm 25 from the current F value to the target F value by use of the diaphragm driving parameters previously acquired from the lens control unit 22 of the interchangeable lens 10.

In step S203, the body control unit 72 calculates the focus driving time. Specifically, the body control unit 72 predicts a focus position when the diaphragm driving end time elapses on the basis of a motion of an object detected when the object is focused in the release button half-pressed state. The body control unit 72 then predicts a focus driving time when the focus lens is moved to the predicted focus position on the basis of a difference between the predicted focus position and the current focus position.

In step S204, the body control unit 72 determines the exposure start timing. The exposure start timing corresponds to the longer time out of the focus driving time and the diaphragm driving end time.

In step S205, the body control unit 72 transmits, to the lens control unit 22, a moving command to move the focus lens to the focus target position with the focus predicted position when the diaphragm driving end time elapses as the focus target position.

In step S221, the lens control unit 22 of the interchangeable lens 10 receives the focus lens moving command transmitted from the body control unit 72 and starts driving the focus lens.

After the body 60 transmits the moving command to move the focus lens to the focus target position in step S205, the processing proceeds to step S206, where the body control unit 72 transmits a command to change the F value of the diaphragm 25 to the target F value to the lens control unit 22.

In step S222, the lens control unit 22 of the interchangeable lens 10 receives the command to change the F value to the target F value transmitted from the body control unit 72, supplies a driving instruction to the diaphragm driving unit 46, and starts driving the diaphragm 25 for the target F value.

In the interchangeable lens 10, the processing ends when the movement of the focus lens to the focus target position and the movement of the diaphragm 25 to the target F value end.

After the body 60 transmits a command to change the F value of the diaphragm 25 to the target F value in step S206, the processing proceeds to step S207, where the body control unit 72 determines whether or not the exposure start timing is reached.

In step S207, the processing waits until it is determined that the exposure start timing is reached.

Then in step S207, in a case where it is determined that the exposure start timing is reached, the processing proceeds to step S208, where the body control unit 72 causes the imaging device 76 to start exposing (capturing) for shooting an image to be recorded.

After the end of exposure, an image signal of the image to be recorded output from the imaging device 76 is recorded in the recording unit 30.

As described above, the body control unit 72 of the body 60 may calculate the diaphragm driving end time on the basis of the diaphragm driving parameters previously acquired as diaphragm driving information from the interchangeable lens 10. The body control unit 72 can acquire each parameter for calculating the diaphragm driving end timing including the stabilization time of the diaphragm 25 described with reference to FIG. 4 as a diaphragm driving parameter from the interchangeable lens 10. Also in this case, the body control unit 72 can accurately grasp the diaphragm driving end timing including the stabilization time, and thus can further shorten a time until the start of shooting (can further speed up shooting) than in a case where a certain margin is secured for an unknown stabilization time in the body 60, for example, thereby contributing to an improvement in focusing accuracy.

Further, exposure for shooting an image to be recorded can be started at a timing not influenced by overshoot or the like of the diaphragm 25, thereby improving the shot image exposure accuracy.

Further, in a case where a phase difference is detected, the unstable diaphragm influences the phase difference detection accuracy. The phase difference is detected at the diaphragm driving end timing including the stabilization time, thereby improving the phase difference detection accuracy.

7. Exemplary Driving System Where Overshoot is Possible

Points which can be causes of overshoot or undershoot in various light amount adjustment mechanisms capable of being employed as the diaphragm 25 will be described below.

First Light Amount Adjustment Apparatus

Figure 10:
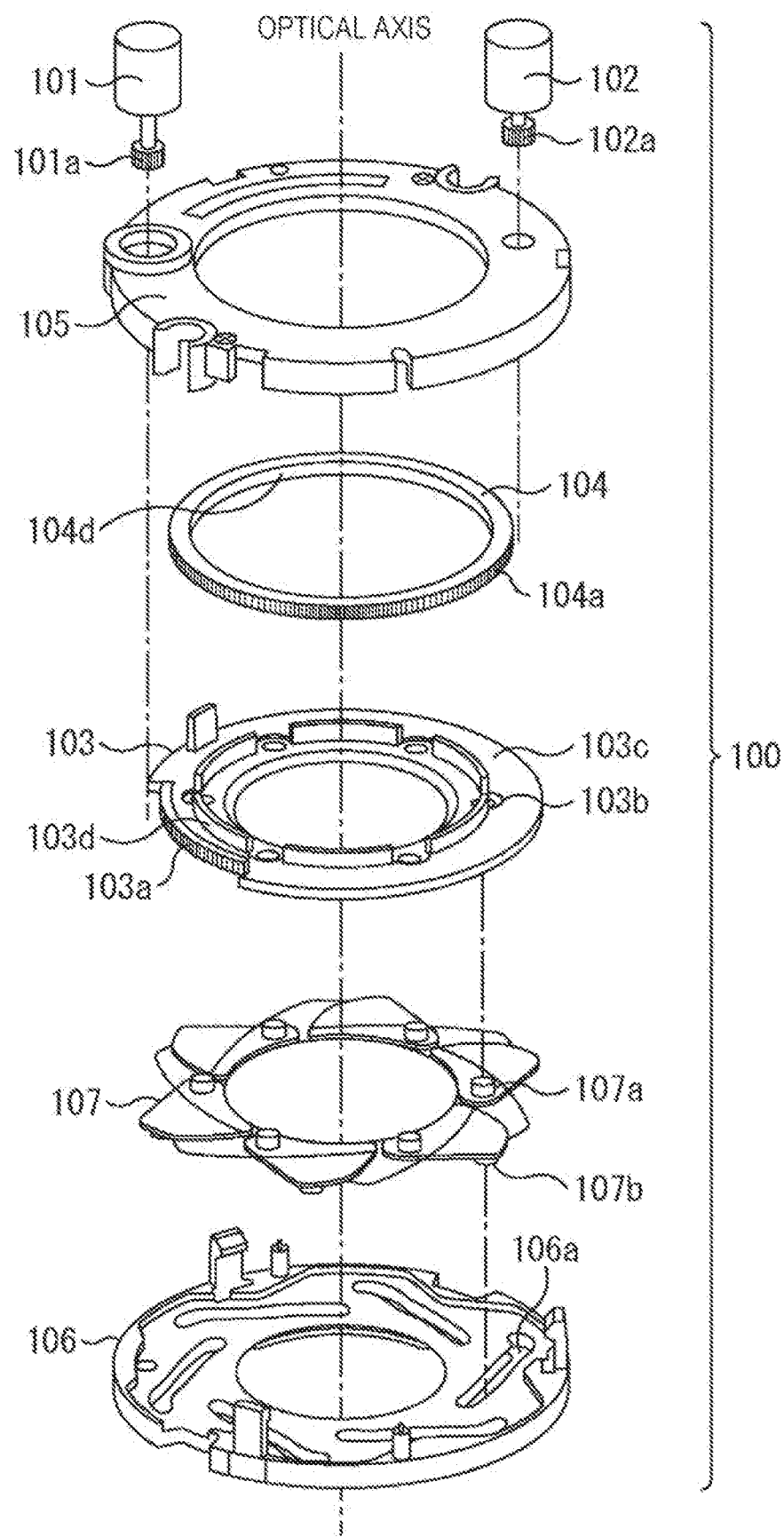
FIG. 10 is an exploded view of a first light amount adjustment apparatus for explaining a cause of overshoot.

FIG. 10 illustrates an exploded view of a first light amount adjustment apparatus capable of being employed as the diaphragm 25.

The first light amount adjustment apparatus illustrated in FIG. 10 is a light amount adjustment apparatus 100 described in Japanese Patent Application Laid-Open No. 2014-164106.

The light amount adjustment apparatus 100 has a main motor 101 as a first motor, an auxiliary motor 102 as a second motor, a main rotation member 103 as a first rotation member, an auxiliary rotation member 104 as a second rotation member, an upper cover 105 as a first cover, a lower cover 106 as a second cover, and a diaphragm blade 107 as a light amount adjustment member.

The main motor 101 employs a stepping motor in order to perform positioning control on the main rotation member 103. The main motor 101 is fixed on the upper cover 105, and is driven and controlled by the control unit provided in the camera main body (not illustrated). An output gear 101a attached to the main motor 101 meshes with a gear part 103a provided on the main rotation member 103, and transmits the output of the main motor 101 to the main rotation member 103. Thereby, the main rotation member 103 is guided to a fitting part of the upper cover 105 to be rotated and driven around the optical axis.

The main rotation member 103 has hole parts 103b, and the lower cover 106 has cam grooves 106a. The diaphragm blade 107 is provided with dowels 107a and 107b, the dowels 107a fit with the hole parts 103b provided on the main rotation member 103, and the dowels 107b fit with the cam grooves 106a provided on the lower cover 106. FIG. 10 illustrates that the diaphragm blade 107 is configured of six blades, and thus illustrates a configuration in which six hole parts 103b, six cam grooves 106a, six dowels 107a, and six dowels 107b are provided.

The main rotation member 103, the upper cover 105, and the lower cover 106 have a ring shape, respectively, and a through-hole including the optical axis is assumed as an optical path. When the main rotation member 103 is rotated and driven by the main motor 101, the dowels 107a of the diaphragm blade 107 fit into the hole parts 103b rotate together with the main rotation member 103 around the optical axis so that the dowels 107b are guided along the cam grooves 106a. When the main motor 101 is driven and controlled to rotate the main rotation member 103 in the diaphragm direction, the diaphragm blade 107 approaches the optical axis so that the amount of light passing through the optical path is adjusted. On the other hand, the main motor 101 is driven and controlled to rotate the main rotation member 103 in the open direction, thereby returning the diaphragm blade 107 to the open diameter.

In the light amount adjustment apparatus 100, fluctuations due to a tension between the stop holding force of the main motor 101 and the inertia force of all the driving members from the output gear 101a attached to the main motor 101 to the gear part 103a, the hole parts 103b, the dowels 107a, the dowels 107b, and the cam grooves 106a, fluctuations due to play between driving members or due to distortion or deflection between driving members, fluctuations due to deflection of the diaphragm blade 107, and the like can be a cause of overshoot or undershoot.

Second Light Amount Adjustment Apparatus

Figure 11:
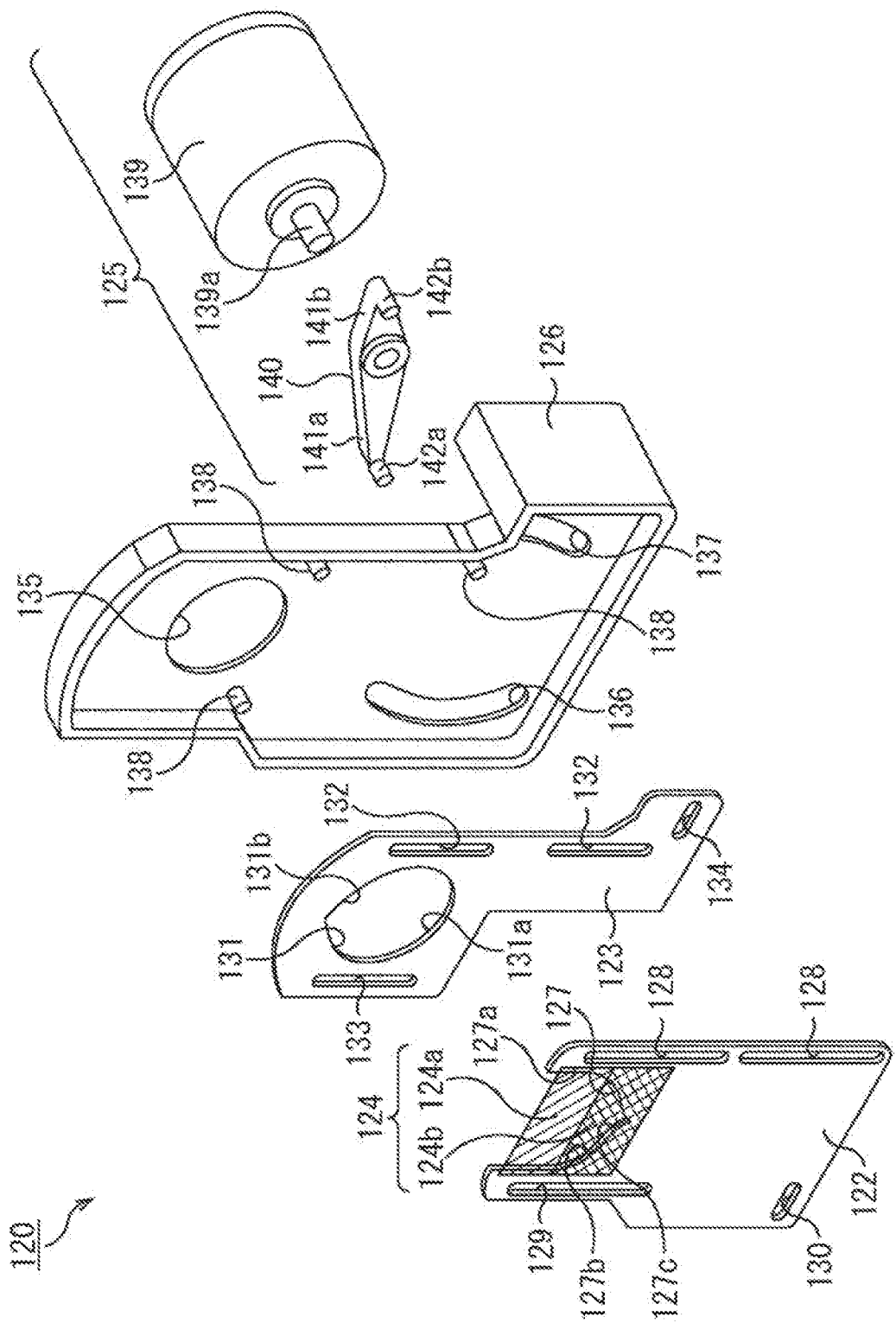
FIG. 11 is an exploded view of a second light amount adjustment apparatus for explaining a cause of overshoot.

FIG. 11 illustrates an exploded view of a second light amount adjustment apparatus capable of being employed as the diaphragm 25.

The second light amount adjustment apparatus illustrated in FIG. 11 is an exposure control mechanism 120 described in Japanese Patent Application Laid-Open No. 2001-272709.

The exposure control mechanism 120 is configured of first and second diaphragm blades 122 and 123, an ND filter 124 attached to the first diaphragm blade 122, a driving means 125 configured to drive the first and second diaphragm blades 122 and 123, a casing 126 fixed with the driving means 125, and the like as illustrated in FIG. 11.

The first and second diaphragm blades 122 and 123 include a relatively flexible resin film, for example, and the first diaphragm blade 122 is arranged closer to an object and the second diaphragm blade 123 is arranged closer to an image in an imaging lens system (not illustrated) of the shooting apparatus.

The first diaphragm blade 122 is formed at its upper edge with a cutout 127 for forming a diaphragm opening, and is formed with guided slits 128 and 128 and a guided slit 129, which vertically extend, closer to the right edge and closer to the left edge, respectively. Further, it is formed with a horizontally-extending coupling long hole 130 closer to the lower edge.

The cutout 127 for forming a diaphragm opening of the first diaphragm blade 122 is opened at the upper edge, and its shape is such that the upper half 127a relative to almost the center in the vertical direction has the same right and left widths, the lower half 127b is narrower downward, and the lower edge (denoted as "triangle part" below) 127c is formed in a flat triangle.

The ND filter 124 is formed such that an upper part 124a and a lower part 124b are different in density to have different transmissivity, respectively, where the upper part 124a has a transmissivity of about 33% and the lower part 124b has a transmissivity of about 10%. Then, the ND filter 124 is attached such that the upper part 124a covers the upper half 127a of the cutout 127 for forming a diaphragm opening of the first diaphragm blade 122 and the lower part 124b covers the lower half 127b of the cutout 127 for forming a diaphragm opening of the first diaphragm blade 122.

The second diaphragm blade 123 has a shape in which a lower part almost in the left half is cut out or a shape in which the lower edge of the right half extends lower than the left half, and is formed at its upper position with an opening 131 for forming a diaphragm opening, and guided slits 132 and 132 and a guided slit 133, which vertically extend, closer to the right edge and closer to the left edge, respectively. Further, a horizontally-extending coupling long hole 134 is formed closer to the lower edge in the downward-extending right half or immediately below the lower right guided slit 132.

The opening 131 for forming a diaphragm opening is such that its entirety 131a (denoted as "circular part" below) is almost circular and its upper edge (denoted as "triangular part" below) 11b is a flat triangle.

The casing 126 is formed with a light passing hole 135 closer to the top, a vertically-long arc-like long hole 136 at a lower left position, and a vertically-long arc-like long hole 137 at a lower right position. Further, one guide pin 138 and two guide pins 138 and 138, which engage with the guided slits 128, 128, 129, 132, 132, and 133 of the first and second diaphragm blades 122 and 123 as described below, are formed to protrude forward (toward an object) on the left side and on the right side, respectively, substantially at the center of the casing 136.

The driving means 125 is configured of a driving motor 139 fixed on the casing 126 from behind in an appropriate manner, and an operation arm 140 fixed on a rotation shaft 139a of the driving motor 139.

The operation arm 140 is fixed at its center on the rotation shaft 139a of the driving motor 139. Then, the operation arm 140 has arm parts 141a and 141b extending in opposite directions, a coupling pin 142a is protruded at the tip of the left arm part 141a, a coupling pin 142b is protruded at the tip of the right arm part 141b, and the left arm part 141a is formed to be longer than the right arm part 141b.

Then, the coupling pin 142a at the left end and the coupling pin 142b at the right end are slidably engaged with the coupling long hole 130 of the first diaphragm blade 122 and the coupling long hole 134 of the second diaphragm blade 123, respectively.

Therefore, when the operation arm 140 rotates, the coupling pins 142a and 142b thereof vertically move in opposite directions, and thus the first diaphragm blade 122 and the second diaphragm blade 123 vertically move in opposite directions. Further, the distance of the coupling pin 142a from the rotation shaft 139a is longer than that of the coupling pin 142b, and thus the first diaphragm blade 122 is faster moved than the second diaphragm blade 123.

Then, the first diaphragm blade 122 and the second diaphragm blade 123 vertically move in opposite directions, and thus the size of an opening where the cutout 127 for forming a diaphragm opening and the opening 131 for forming a diaphragm opening overlap or a diaphragm opening changes.

In the exposure control mechanism 120, fluctuations due to a tension between the stop holding force of the driving motor 139 and the inertia force of all the driving members from the coupling pins 142a and 142b of the operation arm 140 fixed on the rotation shaft 139a of the driving motor 139 to the coupling long hole 130 of the first diaphragm blade 122 and the coupling long hole 134 of the second diaphragm blade 123 slidably engaged with the coupling pins 142a and 142b, respectively, fluctuations due to play between driving members or due to distortion or deflection between driving members, and the like can be a cause of overshoot or undershoot.

Third Light Amount Adjustment Apparatus

Figure 12:
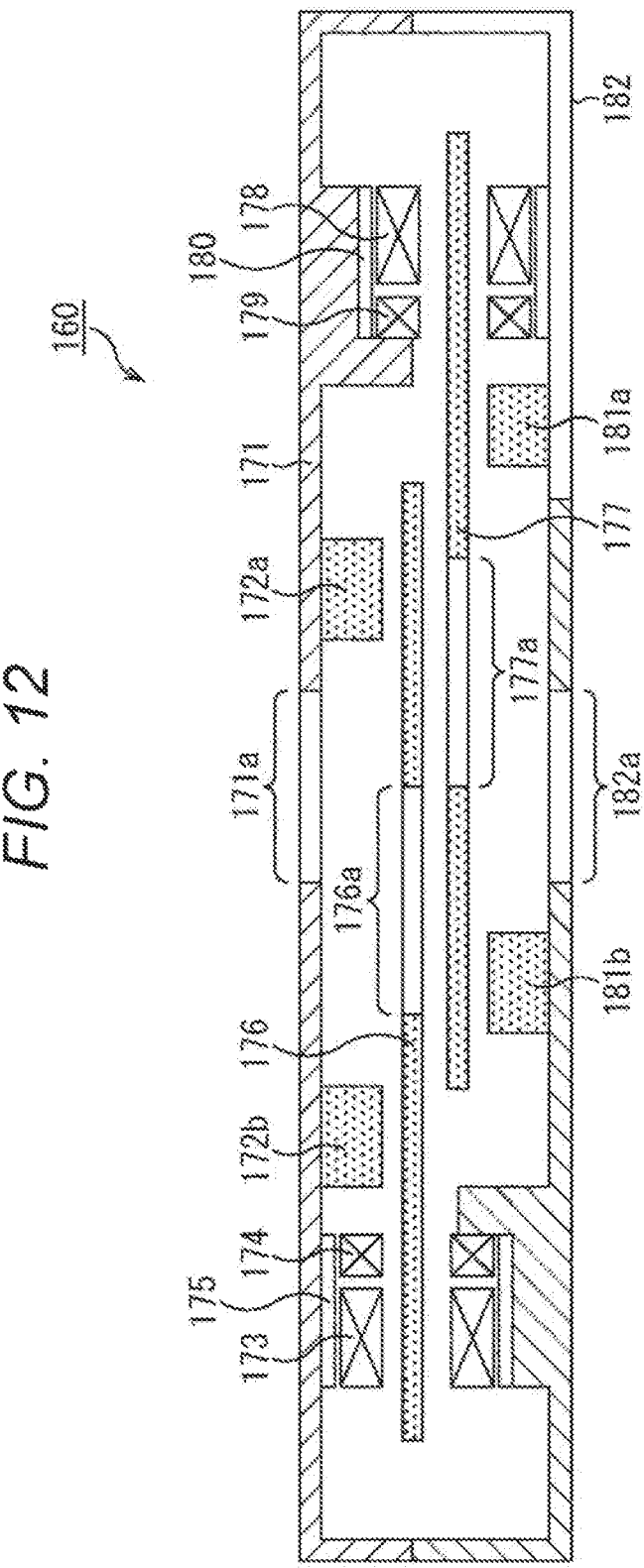
FIG. 12 is an exploded view of a third light amount adjustment apparatus for explaining a cause of overshoot.

FIG. 12 is a cross-section view illustrating a configuration of a third light amount adjustment apparatus capable of being employed as the diaphragm 25.

The third light amount adjustment apparatus illustrated in FIG. 12 is a linearly-driven light amount control apparatus 160 of electromagnetic levitation type described in Japanese Patent Application Laid-Open No. 2-226130.

In FIG. 12, a cover 171 of the light amount control apparatus 160 has an opening 171a, and is mounted on its inner periphery with a pair of light amount control member magnets 172a and 172b across the opening 171a, a driving coil 173 configured to control moving a light amount control member 176, a speed detection coil 174, and a back yoke 175.

On the other hand, a base board 182 as a base has an opening 182a, and is mounted on its inner periphery with a pair of light amount control member support magnets 181a and 181b across the opening 182a, a driving coil 178 configured to control moving a light amount control member 177, a speed detection coil 179, and a back yoke 180.

Then, the light amount control members 176 and 177 are arranged between the cover 171 and the base board 182, have the openings 176a and 177a, respectively, and are magnetized to repel each other, and the light amount control member support magnets 172a and 172b and 181a and 181b are magnetized to repel each other.

In the above configuration, the light amount control members 176 and 177 are floating due to repulsion between the magnetic force of the light amount control member support magnets 172a and 172b and 181a and 181b and the magnetic force of the light amount control members 176 and 177, and are not in contact.

Thus, when a current flows in the driving coils 173 and 178, a driving force is generated due to the magnetic force of the light amount control members 176 and 177 so that the light amount control members 176 and 177 slide in opposite directions.

In the light amount control apparatus 160, fluctuations due to a tension between the stop holding force of the driving coils 173 and 178 and the inertia force of the light amount control members 176 and 177, and the like can be a cause of overshoot or undershoot.

8. Synchronous Command and Asynchronous Command

In the camera system 1 of FIG. 1, one or more commands transmitted at the same timing are packetized into one packet to be transmitted in packet communication. One packet is configured of a header, a command, and a footer, where the header is added ahead of the command and the footer is added behind the command. The footer includes a checksum for confirming the presence of a communication error of the command on the reception side.

Commands exchanged between the lens control unit 22 and the body control unit 72 include two kinds of commands such as synchronous command for making communication in synchronization with a synchronous signal and asynchronous command for making communication at any timing irrespective of a timing of a synchronous signal. Here, the synchronous signals used for the synchronous command include asynchronous signal itself transmitted via a synchronous signal terminal and a divided or multiplied signal of the synchronous signal. That is, the lens control unit 22 makes communication with the body control unit 72 in the synchronous command on the basis of a synchronous signal or a divided or multiplied signal of the synchronous signal. In a case where communication based on a divided or multiplied signal of the synchronous signal is made, the lens control unit 22 performs a processing of generating a signal obtained by dividing or multiplying the synchronous signal transmitted via the synchronous signal terminal.

Asynchronous command is communicated in synchronization with a synchronous signal, and thus a timing to transmit a second synchronous command after transmitting a first synchronous command is to be a timing of a synchronous signal subsequent to the synchronous signal transmitting the first synchronous command.

The synchronous command is used as a command to notify the body control unit 72 of a lens state of the interchangeable lens 10 from the lens control unit 22, for example. Specifically, the synchronous command is used when the lens control unit 22 transmits the position information of the zoom lens 23, the diaphragm 25, the object-side focus lens 26, and the device-side focus lens 27. Further, the synchronous command is used also in a case where the body control unit 72 instructs the lens control unit 22 on a predetermined operation.

To the contrary, the asynchronous command is used to rapidly notify the body control unit 72 of the occurrence of a communication error in a case where the communication error of the command occurs in the interchangeable lens 10, for example. That is, when detecting the presence of a communication error of the command transmitted from the body control unit 72 by determining the checksum, and detecting a communication error, the lens control unit 22 transmits the occurrence of the communication error in an asynchronous command to the body control unit 72. Thereby, the body control unit 72 which receives the asynchronous command indicating the occurrence of the commination error can rapidly perform a recovery processing of recovering the communication error.

Further, the synchronous command is used for a command to change the F value to the target F value, a command to transmit the diaphragm driving end time, and a moving command (including data) to move the focus lens, which are transmitted between the lens control unit 22 and the body control unit 72 in the above shooting processing.

Additionally, in a case where the control unit on the reception side (the lens control unit 22 or the body control unit 72) normally receives a command via the communication terminal, it may return a response indicating the reception of the command or may not return a response depending on the kind of the received command.

Figure 13:
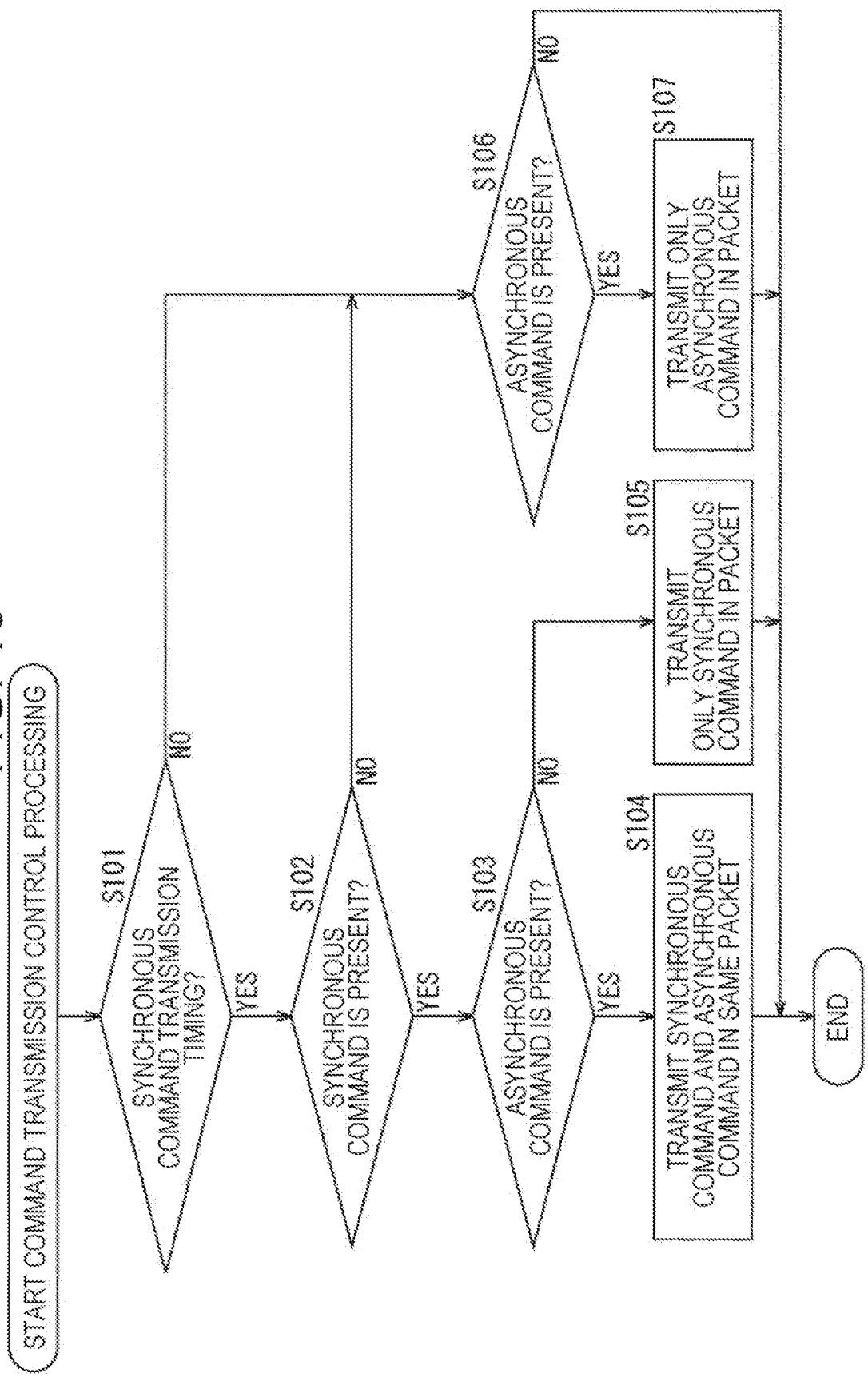
FIG. 13 is a flowchart for explaining a command transmission control processing.

A command transmission control processing, which is a control processing of transmitting a command from the lens control unit 22 to the body control unit 72, will be described with reference to the flowchart of FIG. 13. The command transmission control processing of FIG. 13 is repeatedly performed at a cycle of multiplied synchronous signal or a shorter cycle than the multiplied cycle, for example.

At first, in step S101, the lens control unit 22 determines whether or not a synchronous command transmission timing is reached.

In a case where it is determined in step S101 that a synchronous command transmission timing is reached, in step S102, the lens control unit 22 determines whether or not a synchronous command to be transmitted to the body control unit 72 is present.

In a case where the lens control unit 22 generates a synchronous command to be transmitted to the body control unit 72 along with the control of the interchangeable lens 10 such as focus lens position information or the like, the lens control unit 22 stores it in a queue buffer for synchronous commands inside the lens control unit 22. In step S102, the lens control unit 22 determines whether or not a synchronous command to be transmitted to the body control unit 72 is present in the queue buffer for synchronous commands.

In a case where it is determined in step S102 that asynchronous command to be transmitted to the body control unit 72 is present, the processing proceeds to step S103, where the lens control unit 22 determines whether or not an asynchronous command to be transmitted to the body control unit 72 is present.

In a case where the lens control unit 22 generates an asynchronous command to be transmitted to the body control unit 72 along with the control of the interchangeable lens 10 such as focus lens driving amount information or the like, the lens control unit 22 stores it in a queue buffer for asynchronous commands inside the lens control unit 22. In step S103, the lens control unit 22 determines whether or not an asynchronous command to be transmitted to the body control unit 72 is present in the queue buffer for asynchronous commands.

In a case where it is determined in step S103 that an asynchronous command is present, the processing proceeds to step S104, where the lens control unit 22 transmits the synchronous command and the asynchronous command present in the queue buffers in the same packet to the body control unit 72, and terminates the processing.

Figure 14:
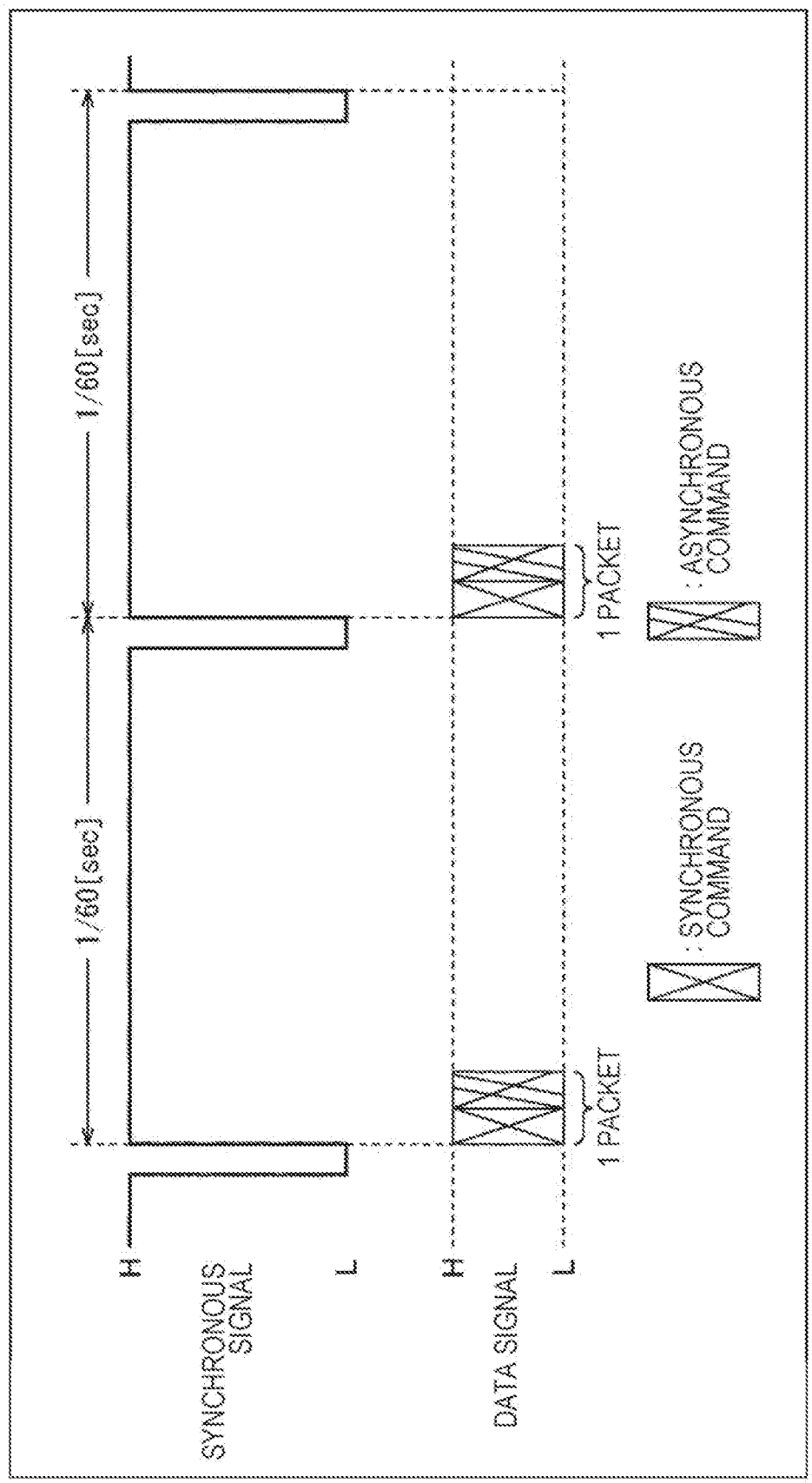
FIG. 14 is a time chart illustrating exemplary packet communication made in step S104 of FIG. 13.

FIG. 14 is a time chart illustrating exemplary packet communication made in step S104.

In FIG. 14, the cycle of a synchronous signal is 1/60 sec and the minimum transmission interval of a synchronous command is 1/60 sec.

In a case where an a synchronous command is present at a synchronous command transmission timing, a synchronous command and an a synchronous command are multiplexed and transmitted in one packet as illustrated in FIG. 14. The state in which asynchronous command and an asynchronous command are in contact in FIG. 14 indicates that the synchronous command and the asynchronous command are transmitted in one packet.

On the other hand, in a case where it is determined in step S103 that an asynchronous command is not present, the processing proceeds to step S105, where the lens control unit 22 transmits only the synchronous command in a packet to the body control unit 72, and terminates the processing.

Figure 15:
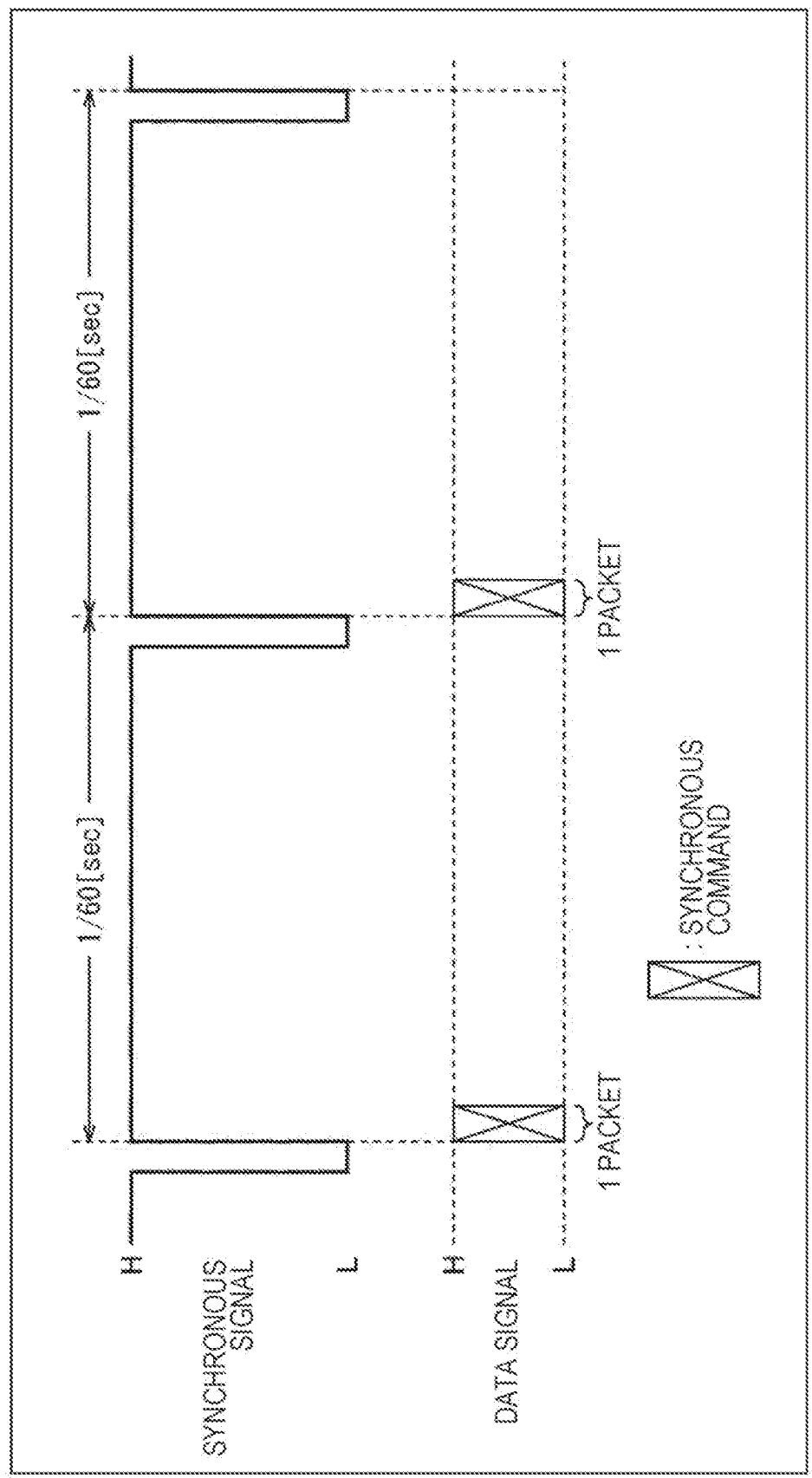
FIG. 15 is a time chart illustrating exemplary packet communication made in step S105 of FIG. 13.

FIG. 15 is a time chart illustrating exemplary packet communication made in step S105.

In a case where an asynchronous command is not present at a synchronous command transmission timing, only the synchronous command is transmitted in one packet as illustrated in FIG. 15.

On the other hand, in a case where it is determined in step S101 that a synchronous command transmission timing is not reached or in a case where it is determined in step S102 that a synchronous command to be transmitted to the body control unit 72 is not present, the processing proceeds to step S106, where the lens control unit 22 determines whether or not an asynchronous command to be transmitted to the body control unit 72 is present in the queue buffer for asynchronous commands.

In a case where it is determined in step S106 that an asynchronous command is present, the processing proceeds to step S107, where the lens control unit 22 transmits only the asynchronous command in a packet to the body control unit 72, and terminates the processing.

Figure 16:
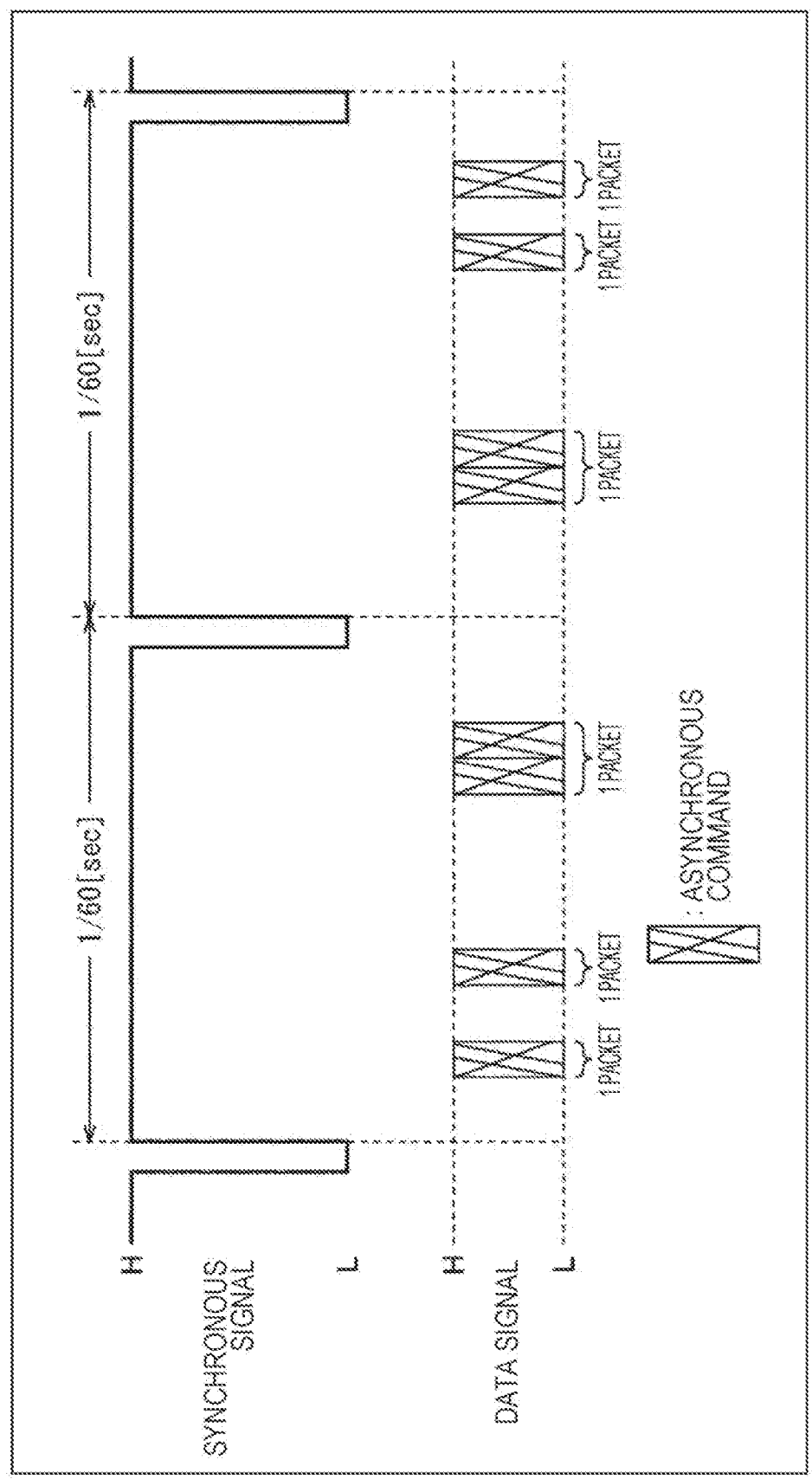
FIG. 16 is a time chart illustrating exemplary packet communication made in step S107 of FIG. 13.

FIG. 16 is a time chart illustrating exemplary packet communication made in step S107.

In a case where an asynchronous command is present other than at a synchronous command transmission timing, only the asynchronous command is transmitted in a packet as illustrated in FIG. 16. In a case where a plurality of asynchronous commands are present, the plurality of asynchronous commands are multiplexed and transmitted in one packet. The state in which two asynchronous commands are in contact in FIG. 16 indicates that the two asynchronous commands are transmitted in one packet. An asynchronous command can be transmitted even at a timing not corresponding to the cycle of the synchronous signal or the cycle of the multiplied synchronous signal.

On the other hand, in a case where it is determined in step S106 that an asynchronous command is not present, the lens control unit 22 terminates the processing. That is, in a case where it is determined in step S106 that an asynchronous command is not present, neither a synchronous command nor an asynchronous command is transmitted and the processing is terminated.

The command transmission control processing is a processing of transmitting a command from the lens control unit 22 to the body control unit 72, but the command transmission control processing is performed also when the body control unit 72 transmits a command to the lens control unit 22.

As described above, in a case where the asynchronous command transmission timing matches with the synchronous command transmission timing, the body control unit 72 and the lens control unit 22 can transmit an asynchronous command and a synchronous command in the same packet.

For example, an asynchronous command indicating the speed information of the focus lenses and a synchronous command indicating the position information of the focus lenses are multiplexed and stored in the command part in a packet, for example. The checksum for confirming the presence of a communication error is calculated in units of packet and is stored in the footer. The checksum determination processing is performed per packet, and thus an asynchronous command and a synchronous command are multiplexed and transmitted in one packet, thereby reducing the checksum determination processing and contributing to a reduction in the computation processing amount and the processing time on the reception side.

Further, an asynchronous command and a synchronous command are transmitted in the same packet, thereby reducing the data communication amount and efficiently exchanging data. Further, the fact contributes to lower power consumption.

As described above, the asynchronous command is used for a command to change the F value to the target F value, a command to transmit the diaphragm driving end time, and a moving command (including data) to move the focus lens. A command to transmit the diaphragm driving end time is transmitted in an asynchronous command so that the body control unit 72 can acquire the accurate diaphragm driving end time without delay, thereby contributing to faster shooting.

The steps described in the flowcharts in the present specification may be of course performed in time series in the described orders, may not necessarily be processed in time series, and may be performed in parallel or at necessary timings such as on calling.

Embodiments of the present technology are not limited to the above embodiments, and can be variously changed without departing from the spirit of the present technology.

For example, a configuration in a combination of all or some of the above embodiments may be employed.

Additionally, the effects described in the present specification are merely exemplary and are not restrictive, and any effect other than the effects described in the present specification may be obtained.

Additionally, the present technology can take the following configurations.

(1) An interchangeable lens including:
a diaphragm;
a diaphragm driving unit configured to drive the diaphragm; and
a lens control unit configured to transmit diaphragm driving information including stabilization time information of the diaphragm to a shooting apparatus when the diaphragm driving unit drives the diaphragm.

(2) The interchangeable lens according to (1),
in which the lens control unit transmits a diaphragm driving parameter including stabilization time information of the diaphragm as the diaphragm driving information to the shooting apparatus.

(3) The interchangeable lens according to (1),
in which the lens control unit transmits information indicating a driving end timing of the diaphragm as the diaphragm driving information to the shooting apparatus before the diaphragm finishes being driven in response to a command to drive the diaphragm from the shooting apparatus.

(4) The interchangeable lens according to (1),
in which the lens control unit transmits information indicating a driving end timing of the diaphragm as the diaphragm driving information to the shooting apparatus before or after the diaphragm starts being driven in response to a command to drive the diaphragm from the shooting apparatus.

(5) The interchangeable lens according to (3) or (4),
in which the lens control unit calculates a driving end timing of the diaphragm on the basis of a time including a driving time and a stabilization time of the diaphragm driving unit.

(6) The interchangeable lens according to (4),
in which when transmitting information indicating a driving end timing of the diaphragm to the shooting apparatus before starting driving the diaphragm, the lens control unit calculates a driving end timing of the diaphragm including a waiting time until the diaphragm driving unit starts driving the diaphragm.

(7) The interchangeable lens according to (4),
in which when transmitting information indicating a driving end timing of the diaphragm to the shooting apparatus after starting driving the diaphragm, the lens control unit calculates a driving end timing of the diaphragm excluding a time after the diaphragm driving unit starts driving the diaphragm and until the information is transmitted to the shooting apparatus.

(8) The interchangeable lens according to any of (3) to (7),
in which the command is a command to change an F value to a predetermined target F value, and
the diaphragm driving unit drives the diaphragm to change a current F value to the predetermined target F value.

(9) The interchangeable lens according to (3), further including:
a recording unit configured to store a convergence waveform in which the amount of light passing through the diaphragm converges on a target light amount value over time,
in which the lens control unit calculates a driving end timing of the diaphragm including a stabilization time of the diaphragm by use of the convergence waveform.

(10) The interchangeable lens according to (8), further including:
a recording unit configured to record table data including a stabilization time of the diaphragm depending on the current F value and the target F value,
in which the lens control unit calculates a driving end timing of the diaphragm including the stabilization time by use of the table data.

(11) The interchangeable lens according to (10),
in which the recording unit stores the table data including the stabilization time measured by use of the interchangeable lens.

(12) The interchangeable lens according to (10) or (11),
in which the recording unit stores the table data per predetermined condition.

(13) The interchangeable lens according to (12), further including:
a temperature sensor configured to detect a temperature,
in which the recording unit stores the table data per temperature, and
the lens control unit calculates a driving end timing of the diaphragm including the stabilization time by use of the table data depending on a detected temperature.

(14) The interchangeable lens according to (12) or (13), further including:
a posture detection sensor configured to detect a posture of the interchangeable lens,
in which the recording unit stores the table data per posture, and
the lens control unit calculates a driving end timing of the diaphragm including the stabilization time by use of the table data depending on a detected posture.

(15) The interchangeable lens according to any of (12) to (14),
in which the recording unit stores the table data per aged state of the interchangeable lens, and
the lens control unit calculates a driving end timing of the diaphragm including the stabilization time by use of the table data depending on the aged state.

(16) The interchangeable lens according to any of (3) to (15),
in which the lens control unit transmits information indicating the driving end timing to the shooting apparatus in asynchronous communication.

(17) An interchangeable lens control method,
in which a lens control unit of an interchangeable lens including a diaphragm, a diaphragm driving unit configured to drive the diaphragm, and the lens control unit transmits diaphragm driving information including stabilization time information of the diaphragm to a shooting apparatus when the diaphragm driving unit drives the diaphragm.

(18) A shooting apparatus including:
a body control unit configured to determine an exposure start timing on the basis of diaphragm driving information including stabilization time information of a diaphragm acquired from an interchangeable lens.

(19) A camera system including an interchangeable lens and a shooting apparatus on which the interchangeable lens is mounted,
in which the interchangeable lens includes:
a diaphragm;
a diaphragm driving unit configured to drive the diaphragm; and
a lens control unit configured to transmit diaphragm driving information including stabilization time information of the diaphragm to the shooting apparatus when the diaphragm driving unit drives the diaphragm, and
the shooting apparatus includes:
a body control unit configured to determine an exposure start timing on the basis of the diaphragm driving information.

(20) The camera system according to (19),
in which the body control unit determines an exposure start timing on the basis of a diaphragm driving parameter including stabilization time information of the diaphragm acquired as the diaphragm driving information from the interchangeable lens.

REFERENCE SIGNS LIST

1 Camera system
10 Interchangeable lens
22 Lens control unit
25 Diaphragm
30 Recording unit
32 Temperature sensor
46 Diaphragm driving unit
60 Shooting apparatus (body)
72 Body control unit
76 Imaging device

The invention claimed is:
1. An interchangeable lens, comprising:
a diaphragm; and
a central processing unit (CPU) configured to:
control a motor to drive the diaphragm;
determine a driving plan for the driving of the diaphragm based on a command to drive the diaphragm from a shooting apparatus, wherein the command corresponds to change of a current aperture value to a target aperture value;
determine stabilization time information of the diaphragm based on the driving plan; and
transmit diaphragm driving information to the shooting apparatus based on the driving of the diaphragm, wherein
the diaphragm driving information includes the stabilization time information of the diaphragm.
2. The interchangeable lens according to claim 1, wherein the CPU is further configured to transmit, to the shooting apparatus, a diaphragm driving parameter including the stabilization time information of the diaphragm as the diaphragm driving information.
3. The interchangeable lens according to claim 1, wherein
the CPU is further configured to transmit, to the shooting apparatus, information indicating a driving end timing of the diaphragm as the diaphragm driving information,
the information is transmitted before an end of the driving of the diaphragm, and
the end of the driving of the diaphragm is based on the command.
4. The interchangeable lens according to claim 1, wherein
the CPU is further configured to transmit, to the shooting apparatus, information indicating a driving end timing of the diaphragm as the diaphragm driving information, and
the information is transmitted before or after a start of the driving of the diaphragm,
the information is started based on the command.
5. The interchangeable lens according to claim 3, wherein the CPU is further configured to calculate the driving end timing of the diaphragm based on a time including a driving time and a stabilization time of the motor.
6. The interchangeable lens according to claim 4, wherein
the CPU is further configured to calculate the driving end timing of the diaphragm based on a determination that the information is transmitted before the start of the driving of the diaphragm, and
the driving end timing of the diaphragm includes a waiting time until the start of the driving of the diaphragm.
7. The interchangeable lens according to claim 4, wherein
the CPU is further configured to calculate the driving end timing of the diaphragm based on a determination that the information is transmitted after the start of the driving of the diaphragm, and
the driving end timing of the diaphragm excludes a time after the start of the driving of the diaphragm and until the information is transmitted to the shooting apparatus.
8. The interchangeable lens according to claim 3, wherein the CPU is further configured to control the motor to drive the diaphragm to change the current aperture value to the target aperture value.
9. The interchangeable lens according to claim 3, further comprising:
a storage medium, wherein the CPU is further configured to:
control the storage medium to store a convergence waveform that indicates an amount of light passing through the diaphragm converges on a target light amount value over time; and
calculate the driving end timing of the diaphragm based on the convergence waveform, wherein the driving end timing of the diaphragm includes a stabilization time of the diaphragm.
10. The interchangeable lens according to claim 8, further comprising:
a storage medium, wherein the CPU is further configured to:
control the storage medium to record table data including the current aperture value and the target aperture value, wherein the table data includes a stabilization time of the diaphragm; and
calculate the driving end timing of the diaphragm including the stabilization time based on the table data.

11. The interchangeable lens according to claim 10, wherein the CPU is further configured to:
measure the stabilization time; and
control the storage medium to store the table data including the stabilization time measured by the interchangeable lens.

12. The interchangeable lens according to claim 10, wherein the CPU is further configured to control the storage medium to store the table data based on a condition.

13. The interchangeable lens according to claim 12, further comprising:
a temperature sensor configured to detect a temperature, wherein the CPU is further configured to:
control the storage medium to store the table data based on the detected temperature; and
calculate the driving end timing of the diaphragm based on the table data and the detected temperature.

14. The interchangeable lens according to claim 12, further comprising:
a posture detection sensor configured to detect a posture of the interchangeable lens,
wherein the CPU is further configured to:
control the storage medium to store the table data based on the detected posture; and
calculate the driving end timing of the diaphragm based on the table data and the detected posture.

15. The interchangeable lens according to claim 12, wherein the CPU is further configured to:
control the storage medium to store the table data based on aged state of the interchangeable lens; and
calculate the driving end timing of the diaphragm based on the table data and the aged state.

16. The interchangeable lens according to claim 3, wherein the CPU is further configured to transmit the information indicating the driving end timing to the shooting apparatus in asynchronous communication.

17. An interchangeable lens control method, comprising:
in an interchangeable lens comprising a diaphragm:
controlling a motor to drive the diaphragm;
determining a driving plan for the driving of the diaphragm based on a command to drive the diaphragm from a shooting apparatus, wherein the command corresponds to change of a current aperture value to a target aperture value;
determining stabilization time information of the diaphragm based on the driving plan; and
transmitting diaphragm driving information to the shooting apparatus based on the driving of the diaphragm, wherein
the diaphragm driving information includes the stabilization time information of the diaphragm.

18. A shooting apparatus, comprising:
a central processing unit (CPU) configured to:
acquire diaphragm driving information from an interchangeable lens, wherein
the diaphragm driving information includes stabilization time information of a diaphragm,
the stabilization time information of the diaphragm is determined based on a driving plan of the diaphragm,
the driving plan is determined based on a command to drive the diaphragm from the shooting apparatus, and
the command corresponds to change of a current aperture value to a target aperture value; and
determine an exposure start timing based on the diaphragm driving information.

19. A camera system, comprising:
an interchangeable lens; and
a shooting apparatus, wherein
the interchangeable lens is on the shooting apparatus, and
the interchangeable lens comprises:
a diaphragm; and
a first central processing unit (CPU) configured to:
control a motor to drive the diaphragm;
determine a driving plan for the driving of the diaphragm based on a command to drive the diaphragm from the shooting apparatus, wherein the command corresponds to change of a current aperture value to a target aperture value;
determine stabilization time information of the diaphragm based on the driving plan; and
transmit diaphragm driving information to the shooting apparatus based on the driving of the diaphragm, wherein
the diaphragm driving information includes the stabilization time information of the diaphragm; and
the shooting apparatus comprises:
a second CPU configured to determine an exposure start timing based on the diaphragm driving information.

20. The camera system according to claim 19, wherein the second CPU is further configured to determine the exposure start timing based on a diaphragm driving parameter including the stabilization time information of the diaphragm acquired as the diaphragm driving information from the interchangeable lens.

* * * * *